United States Patent
Zorgui et al.

(10) Patent No.: US 12,402,099 B2
(45) Date of Patent: Aug. 26, 2025

(54) DISTANCE-DEPENDENT POSITION REFERENCE SIGNAL (PRS) CONFIGURATION

(71) Applicant: QUALCOMM Incorporated, San Diego, CA (US)

(72) Inventors: Marwen Zorgui, San Diego, CA (US); Srinivas Yerramalli, San Diego, CA (US); Ahmed Elshafie, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 438 days.

(21) Appl. No.: 18/063,674

(22) Filed: Dec. 8, 2022

(65) Prior Publication Data

US 2024/0196363 A1  Jun. 13, 2024

(51) Int. Cl.
*H04W 64/00* (2009.01)
*H04W 72/51* (2023.01)

(52) U.S. Cl.
CPC ....... *H04W 64/006* (2013.01); *H04W 64/003* (2013.01); *H04W 72/51* (2023.01)

(58) Field of Classification Search
CPC . H04W 64/006; H04W 64/003; H04W 64/00; H04W 72/51
See application file for complete search history.

(56) References Cited

FOREIGN PATENT DOCUMENTS

| WO | 2022032466 A1 | 2/2022 |
|----|---------------|--------|
| WO | 2022197909 A2 | 9/2022 |
| WO | 2022212139 A1 | 10/2022 |

OTHER PUBLICATIONS

International Search Report and Written Opinion—PCT/US2023/075112—ISA/EPO—Jan. 5, 2024.

*Primary Examiner* — Justin Y Lee
(74) *Attorney, Agent, or Firm* — Thien T. Nguyen

(57) ABSTRACT

An example method for distance-dependent positioning of a user device (UE) performed by a location server, the method comprising: sending, to a transmission/reception point (TRP), a first configuration for distance-dependent position reference signal (PRS) resource sets, the distance-dependent PRS resource sets comprising at least: a first PRS resource set for positioning the UE when an estimated distance between the UE and the TRP is within a first range interval. The method also comprises determining the estimated distance between the UE and the TRP, sending, to the UE, a second configuration for determining PRS measurements based on at least one PRS resource set of the distance-dependent PRS resource sets at the TRP, the at least one PRS resource set corresponding to the estimated distance between the UE and the TRP, and receiving, from the UE, the PRS measurements; and determining the position of the UE based on the PRS measurements.

26 Claims, 13 Drawing Sheets

DISTANCE-DEPENDENT POSITION REFERENCE SIGNAL (PRS) CONFIGURATION

BACKGROUND

1. Field of Disclosure

The present disclosure relates generally to the field of wireless communications, and more specifically to determining the location of a mobile device with radio frequency (RF) signals.

2. Description of Related Art

In a wireless communication network, the position of a mobile device may be determined by using the mobile device to measure RF signals transmitted by transmitting devices of the wireless communication network. The measurements made by the mobile device to perform this type of network-based positioning typically assume the mobile device is far enough away from the transmitting devices that near-field transmission effects do not apply. But this may not always be the case.

BRIEF SUMMARY

An example method for distance-dependent positioning of a user device (UE) performed by a location server, the method comprising: sending, to a transmission/reception point (TRP), a first configuration for distance-dependent position reference signal (PRS) resource sets, the distance-dependent PRS resource sets comprising at least: a first PRS resource set for positioning the UE when an estimated distance between the UE and the TRP is within a first range interval. The method also comprises determining the estimated distance between the UE and the TRP and sending, to the UE, a second configuration for determining PRS measurements based on at least one PRS resource set of the distance-dependent PRS resource sets at the TRP, the at least one PRS resource set corresponding to the estimated distance between the UE and the TRP. The method further comprises receiving, from the UE, the PRS measurements; and determining the position of the UE based on the PRS measurements.

An example method for distance-dependent positioning of a user device (UE) performed by a transmission/reception point (TRP), the method comprising: receiving, from a location server, a first configuration for distance-dependent position reference signal (PRS) resource sets at the TRP, wherein the distance-dependent PRS resource sets comprising at least: a first PRS resource set for positioning the UE when an estimated distance between the UE and the TRP is within a first range interval. The method also comprises sending, to the UE, a PRS resource set corresponding to the estimated distance between the UE and the TRP.

An example method for distance-dependent positioning of a user device (UE) performed by a location server, the method comprising: receiving, from an Operations and Maintenance (O&M) server or a base station, a first configuration for distance-dependent position reference signal (PRS) resource sets, the distance-dependent PRS resource sets comprising at least: a first PRS resource set for positioning the UE when an estimated distance between the UE and a TRP of the base station is within a first range interval. The method also comprises determining the estimated distance between the UE and the TRP and sending, to the UE, a second configuration for determining PRS measurements based on at least one PRS resource set of the distance-dependent PRS resource sets at the TRP, the at least one PRS resource set corresponding to the estimated distance between the UE and the TRP. The method further comprises receiving, from the UE, the PRS measurements; and determining the position of the UE based on the PRS measurements.

An example location server comprising: one or more transceivers, a memory, and one or more processors communicatively coupled with the one or more transceivers and the memory, wherein the one or more processors are configured to: send, to a transmission/reception point (TRP), a first configuration for distance-dependent position reference signal (PRS) resource sets, the distance-dependent PRS resource sets comprising at least: a first PRS resource set for positioning the UE when an estimated distance between the UE and the TRP is within a first range interval. The one or more processors are also configured to determine the estimated distance between the UE and the TRP and send, to the UE, a second configuration for determining PRS measurements based on at least one PRS resource set of the distance-dependent PRS resource sets at the TRP, the at least one PRS resource set corresponding to the estimated distance between the UE and the TRP. The one or more processors are further configured to receive, from the UE, the PRS measurements; and determine the position of the UE based on the PRS measurements.

An example system comprising: one or more transceivers, a memory, and one or more processors communicatively coupled with the one or more transceivers and the memory, wherein the one or more processors are configured to: receive, from a location server, a first configuration for distance-dependent position reference signal (PRS) resource sets at a transmission/reception point (TRP) of the system, wherein the distance-dependent PRS resource sets comprising at least: a first PRS resource set for positioning the UE when an estimated distance between the UE and the TRP is within a first range interval. The one or more processors are also configured to send, to the UE, a PRS resource set corresponding to the estimated distance between the UE and the TRP.

An example location server comprising: one or more transceivers, a memory, and one or more processors communicatively coupled with the one or more transceivers and the memory, wherein the one or more processors are configured to: receive, from an Operations and Maintenance (O&M) server or a base station, a first configuration for distance-dependent position reference signal (PRS) resource sets, the distance-dependent PRS resource sets comprising at least: a first PRS resource set for positioning the UE when an estimated distance between the UE and a TRP of the base station is within a first range interval. The one or more processors are also configured to determine the estimated distance between the UE and the TRP. The one or more processors are also configured to send, to the UE, a second configuration for determining PRS measurements based on at least one PRS resource set of the distance-dependent PRS resource sets at the TRP, the at least one PRS resource set corresponding to the estimated distance between the UE and the TRP. The one or more processors are also configured to receive, from the UE, the PRS measurements. The one or more processors are further configured to determine the position of the UE based on the PRS measurements.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
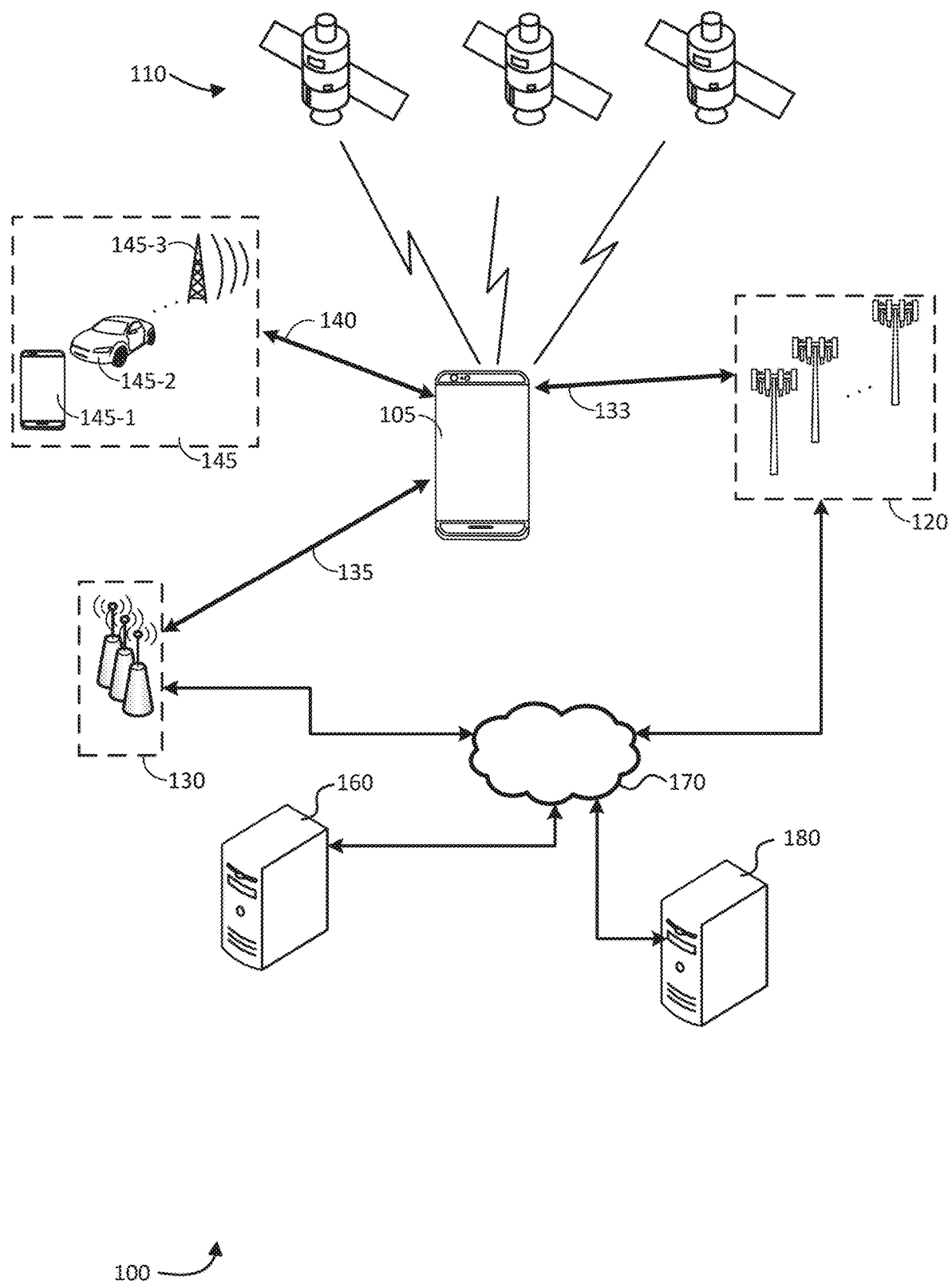
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) as defined in relevant wireless standards.

Further, unless otherwise specified, the term "positioning" as used herein may absolute location determination, relative location determination, ranging, or a combination thereof. Such positioning may include and/or be based on timing, angular, phase, or power measurements, or a combination thereof (which may include RF sensing measurements) for the purpose of location or sensing services.

Positioning of a user device (UE) using a reference signal (e.g., downlink PRS (DL-PRS)) typically assumes the UE is operating within a far-field operational distance from a base station. This may not always be the case for every base station and UE. For example, a UE located within a range of between about 10 m and about 20 m away from the base station may be considered as operating in the near-field operational distance from the base station where near-field effects (e.g., RF signal wave front arriving at the receiving device has curvature) may need to be considered. Accordingly, different measurements may be needed for positioning UEs at different distance from the base station.

The technical schemes disclosed herein address these and other issues by providing distance-dependent reference signal configurations where UEs at different distances (e.g., estimate distances) from the base station are configured to measure different reference signals (e.g., different DL-PRS resource sets) and/or according to different measurement configurations. The UE may determine measurements of the reference signals corresponding to the UE's distance from the base station according to the distance-dependent reference signal configurations.

FIG. 1 is a simplified illustration of a positioning system 100 in which a UE 105, location server 160, and/or other components of the positioning system 100 can use the techniques provided herein for positioning the UE 105 based on distance-dependent PRS resource sets at a Transmission Reception Point (TRP), according to an embodiment. The techniques described herein may be implemented by one or more components of the positioning system 100. The positioning system 100 can include: a UE 105; one or more satellites 110 (also referred to as space vehicles (SVs)), which may include Global Navigation Satellite System (GNSS) satellites (e.g., satellites of the Global Positioning System (GPS), GLONASS, Galileo, Beidou, etc.) and/or Non-Terrestrial Network (NTN) satellites; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUS), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IOT), Enhanced Mobile Broadband (eMBB), or others) that may provide access for different types of devices. In some cases, the term "cell" may refer to a portion of a geographic coverage area (e.g., a sector) over which the logical entity operates.

Satellites 110 may be utilized for positioning of the UE 105 in one or more ways. For example, satellites 110 (also referred to as space vehicles (SVs)) may be part of a Global Navigation Satellite System (GNSS) such as the Global Positioning System (GPS), GLONASS, Galileo or Beidou. Positioning using RF signals from GNSS satellites may comprise measuring multiple GNSS signals at a GNSS receiver of the UE 105 to perform code-based and/or carrier-based positioning, which can be highly accurate. Additionally or alternatively, satellites 110 may be utilized for NTN-based positioning, in which satellites 110 may functionally operate as TRPs (or TPs) of a network (e.g., LTE and/or NR network) and may be communicatively coupled with network 170. In particular, reference signals (e.g., PRS) transmitted by satellites 110 NTN-based positioning may be similar to those transmitted by base stations 120, and may be coordinated by a location server 160. In some embodiments, satellites 110 used for NTN-based positioning may be different than those used for GNSS-based positioning. In some embodiments NTN nodes may include non-terrestrial vehicles such as airplanes, balloons, drones, etc., which may be in addition or as an alternative to NTN satellites.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the UE 105, or a combination thereof. Wireless signals from mobile devices 145 used for positioning of the UE 105 may comprise RF signals using, for example, Bluetooth® (including Bluetooth Low Energy (BLE)), IEEE 802.11x (e.g., Wi-Fi®), Ultra Wideband (UWB), IEEE 802.15x, or a combination thereof. Mobile devices 145 may additionally or alternatively use non-RF wireless signals for positioning of the UE 105, such as infrared signals or other optical technologies.

Mobile devices 145 may comprise other UEs communicatively coupled with a cellular or other mobile network (e.g., network 170). When one or more other mobile devices 145 comprising UEs are used in the position determination of a particular UE 105, the UE 105 for which the position is to be determined may be referred to as the "target UE," and each of the other mobile devices 145 used may be referred to as an "anchor UE." For position determination of a target UE, the respective positions of the one or more anchor UEs may be known and/or jointly determined with the target UE. Direct communication between the one or more other mobile devices 145 and UE 105 may comprise sidelink and/or similar Device-to-Device (D2D) communication technologies. Sidelink, which is defined by 3GPP, is a form of D2D communication under the cellular-based LTE and NR standards. UWB may be one such technology by which the positioning of a target device (e.g., UE 105) may be facilitated using measurements from one or more anchor devices (e.g., mobile devices 145).

According to some embodiments, such as when the UE 105 comprises and/or is incorporated into a vehicle, a form of D2D communication used by the UE 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The UE 105 illustrated in FIG. 1 may correspond to a component or device on a vehicle, RSU, or other V2X entity that is used to communicate V2X messages. In embodiments in which V2X is used, the static communication/positioning device 145-3 (which may correspond with an RSU) and/or the vehicle 145-2, therefore, may communicate with the UE 105 and may be used to determine the position of the UE 105 using techniques similar to those used by base stations 120 and/or APs 130 (e.g., using multiangulation and/or multilateration). It can be further noted that mobile devices 145 (which may include V2X devices), base stations 120, and/or APs 130 may be used together (e.g., in a WWAN positioning solution) to determine the position of the UE 105, according to some embodiments.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., the location of a base station 120 or AP 130) or some other location such as a location for UE 105 at some known previous time, or a location of a mobile device 145 (e.g., another UE) at some known previous time). A location may be specified as a geodetic location comprising coordinates which may be absolute (e.g., latitude, longitude and optionally altitude), relative (e.g., relative to some known absolute location) or local (e.g., X, Y and optionally Z coordinates according to a coordinate system defined relative to a local area such a factory, warehouse, college campus, shopping mall, sports stadium or convention center). A location may instead be a civic location and may then comprise one or more of a street address (e.g., including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
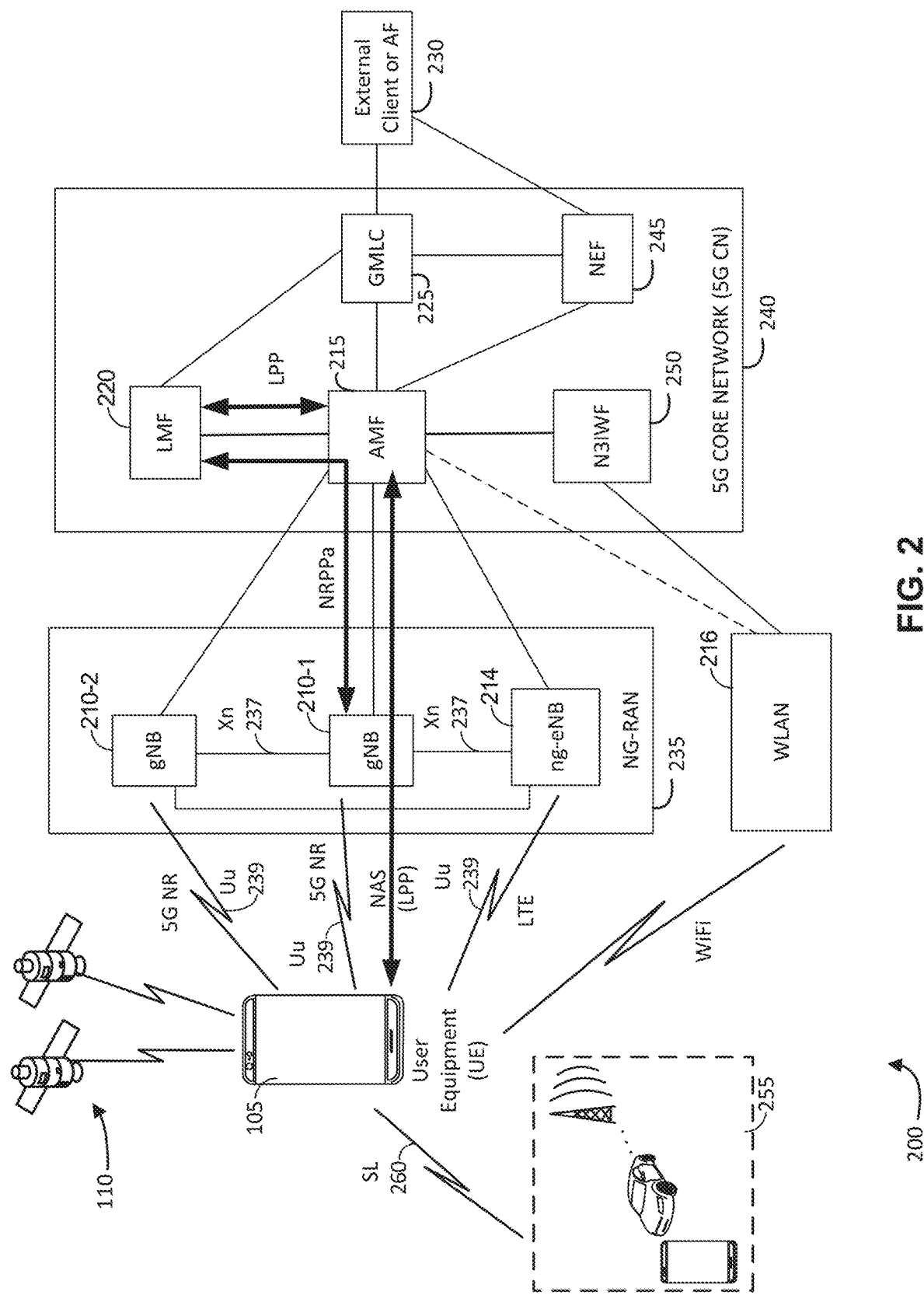
FIG. 2 is a diagram of a 5th Generation (5G) New Radio (NR) positioning system, illustrating an embodiment of a positioning system (e.g., the positioning system of FIG. 1) implemented within a 5G NR communication network.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes, which may include NR NodeB (gNB) 210-1 and 210-2 (collectively and generically referred to herein as gNBs 210), ng-eNB 214, and/or WLAN 216 to implement one or more positioning methods. The gNBs 210 and/or the ng-eNB 214 may correspond with base stations 120 of FIG. 1, and the WLAN 216 may correspond with one or more access points 130 of FIG. 1. Optionally, the 5G NR positioning system 200 additionally may be configured to determine the location of a UE 105 by using an LMF 220 (which may correspond with location server 160) to implement the one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network.

The 5G NR positioning system 200 may further utilize information from satellites 110. As previously indicated, satellites 110 may comprise GNSS satellites from a GNSS system like Global Positioning System (GPS) or similar system (e.g. GLONASS, Galileo, Beidou, Indian Regional Navigational Satellite System (IRNSS)). Additionally or alternatively, satellites 110 may comprise NTN satellites that may be communicatively coupled with the LMF 220 and may operatively function as a TRP (or TP) in the NG-RAN 235. As such, satellites 110 may be in communication with one or more gNB 210.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IOT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (ELTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR positioning system 200, such as the LMF 220 and AMF 215.

5G NR positioning system 200 may also include one or more WLANs 216 which may connect to a Non-3GPP Inter Working Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. As noted, this can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node (e.g., gNB 210, ng-eNB 214, or WLAN 216) of a first RAT to an access node of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Frequency Difference Of Arrival (FDOA), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT. AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-NB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly. LPP and/or LPP messages may be transferred between the UE 105 and the LMF 220 via the AMF 215, N3IWF 250, and serving WLAN 216 for UE 105 to support UE assisted or UE based positioning of UE 105 by LMF 220, described in more detail hereafter.

Positioning of the UE 205 in a 5G NR positioning system 200 further may utilize measurements between the UE 205 and one or more other UEs 255 via a sidelink connection SL 260. As shown in FIG. 2, the one or more other UEs 255 may comprise any of a variety of different device types, including mobile phones, vehicles, roadside units (RSUs), other device types, or any combination thereof. One or more position measurement signals sent via SL 260 to the UE 205 from the one or more other UEs 255, to the one or more other UEs 255 from the UE 205, or both. Various signals may be used for position measurement, including sidelink PRS (SL-PRS). In some instances, the position of at least one of the one or more of the other UEs 255 may be determined at the same time (e.g., in the same positioning session) as the position of the UE 205. In some embodiments, the LMF 220 may coordinate the transmission of positioning signals via SL 260 between the UE 205 and the one or more other UEs 255. Additionally or alternatively, the UE 205 and the one or more other UEs 255 may coordinate a positioning session between themselves, without an LMF 220 or even a Uu connection 239 to an access node of the NG-RAN 235. To do so, the UE 205 and the one or more other UEs 255 may communicate messages via the SL 260 using sidelink positioning protocol (SLPP). In some scenarios, the one or more other UEs 255 may have a Uu connection 239 with an access node of the NG-RAN 235 and/or Wi-Fi connection with WLAN 216 when the UE 205 does not. In such instances, the one or more other UEs 255 may operate as relay devices, relaying communications to the network (e.g., LMF 220) from the UE 205. In such instances, a plurality of other UEs 255 may form a chain between the UE 205 and the access node.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAOA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 3:
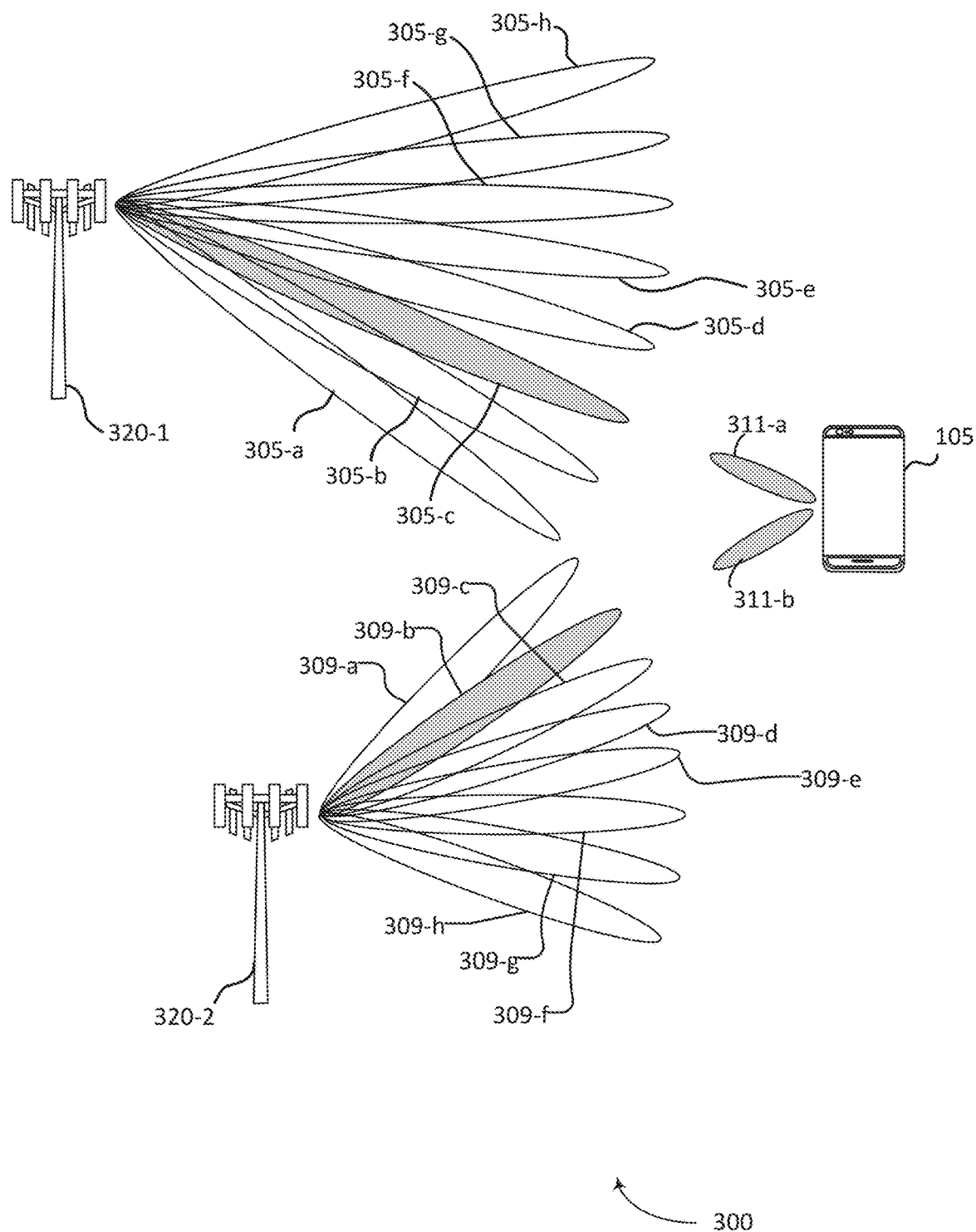
FIG. 3 is a diagram showing an example of how beamforming may be performed, according to some embodiments.

FIG. 3 is a diagram illustrating a simplified environment 300 including two base stations 320-1 and 320-2 which may correspond to base stations 120 of FIG. 1 and/or gNBs 210 and/or ng-eNB 214 of FIG. 2 with antenna arrays that can perform beamforming to produce directional beams for transmitting and/or receiving RF signals. FIG. 3 also illustrates a UE 105, which may also use beamforming for transmitting and/or receiving RF signals. Such directional beams are used in 5G NR wireless communication networks. Each directional beam may have a beam width centered in a different direction, enabling different beams of a base station 320 to correspond with different areas within a coverage area for the base station 320.

Different modes of operation may enable base stations 320-1 and 320-2 to use a larger or smaller number of beams. For example, in a first mode of operation, a base station 320 may use 16 beams, in which case each beam may have a relatively wide beam width. In a second mode of operation, a base station 320 may use 64 beams, in which case each beam may have a relatively narrow beam width. Depending on the capabilities of a base station 320, the base station may use any number of beams the base station 320 may be capable of forming. The modes of operation and/or number of beams may be defined in relevant wireless standards and may correspond to different directions in either or both azimuth and elevation (e.g., horizontal and vertical directions). Different modes of operation may be used to transmit and/or receive different signal types. Additionally or alternatively, the UE 105 may be capable of using different numbers of beams, which may also correspond to different modes of operation, signal types, etc.

In some situations, a base station 320 may use beam sweeping. Beam sweeping is a process in which the base station 320 may send an RF signal in different directions using different respective beams, often in succession, effectively "sweeping" across a coverage area. For example, a base station 320 may sweep across 120 or 360 degrees in an azimuth direction, for each beam sweep, which may be periodically repeated. Each direction beam can include an RF reference signal (e.g., a PRS resource), where base station 320-1 produces a set of RF reference signals that includes Tx beams 305-a, 305-b, 305-c, 305-d, 305-e, 305-f, 305-g, and 305-h, and the base station 320-2 produces a set of RF reference signals that includes Tx beams 309-a, 309-b, 309-c, 309-d, 309-e, 309-f, 309-g, and 309-h. As noted, because UE 105 may also include an antenna array, it can receive RF reference signals transmitted by base stations 320-1 and 320-2 using beamforming to form respective receive beams (Rx beams) 311-a and 311-b. Beamforming in this manner (by base stations 320 and optionally by UEs 105) can be used to make communications more efficient. They can also be used for other purposes, including taking measurements for position determination (e.g., AoD and AoA measurements).

As noted above, a PRS may be transmitted by wireless nodes (e.g., base stations 120) after appropriate configuration (e.g., by an Operations and Maintenance (O&M) server) for positioning a UE 105. In the 5G NR positioning system 200 illustrated in FIG. 2, a TRP (gNB 210, ng-eNB 214, and/or WLAN 216) may transmit PRS signals (i.e., a DL-PRS) according to frame configurations (e.g., a DL-PRS configuration), which may be measured and used for position determination of the UE 105. As noted, other types of wireless network nodes, including other UEs, may also be configured to transmit PRS signals configured in a manner similar to (or the same as) that described above.

The DL-PRS configuration is provided in a hierarchy. In current iterations of the NR standard, UE 105 can be configured with up to four DL-PRS position frequency layers (PFLs) (or simply "PFLs") each having at most 64 TRPs. Each TRP per PFL can have two DL-PRS resource sets (or simply "PRS resource sets"). A DL-PRS PFL is defined as a collection of DL-PRS resource sets which have the same subcarrier spacing (SCS) and cyclic prefix (CP) type, the same value of DL-PRS bandwidth, the same center frequency, and the same value of comb size.

A "PRS resource set" comprises a group of PRS resources used for the transmission of PRS signals, where each PRS resource has a PRS resource ID. Each PRS resource set can have up to 64 PRS resources. In addition, the PRS resources in a PRS resource set are associated with the same TRP. A PRS resource set is identified by a PRS resource set ID and is associated with a particular TRP (identified by a cell ID). A PRS resource ID in a PRS resource set may be associated with a single beam (and/or beam ID) transmitted from a single TRP (where a TRP may transmit one or more beams). That is, each PRS resource of a PRS resource set may be transmitted on a different beam, and as such, a PRS resource (or simply "resource") can also be referred to as a "beam." Note that this does not have any implications on whether the TRPs and the beams on which PRS are transmitted are known to the UE.

Figure 4:
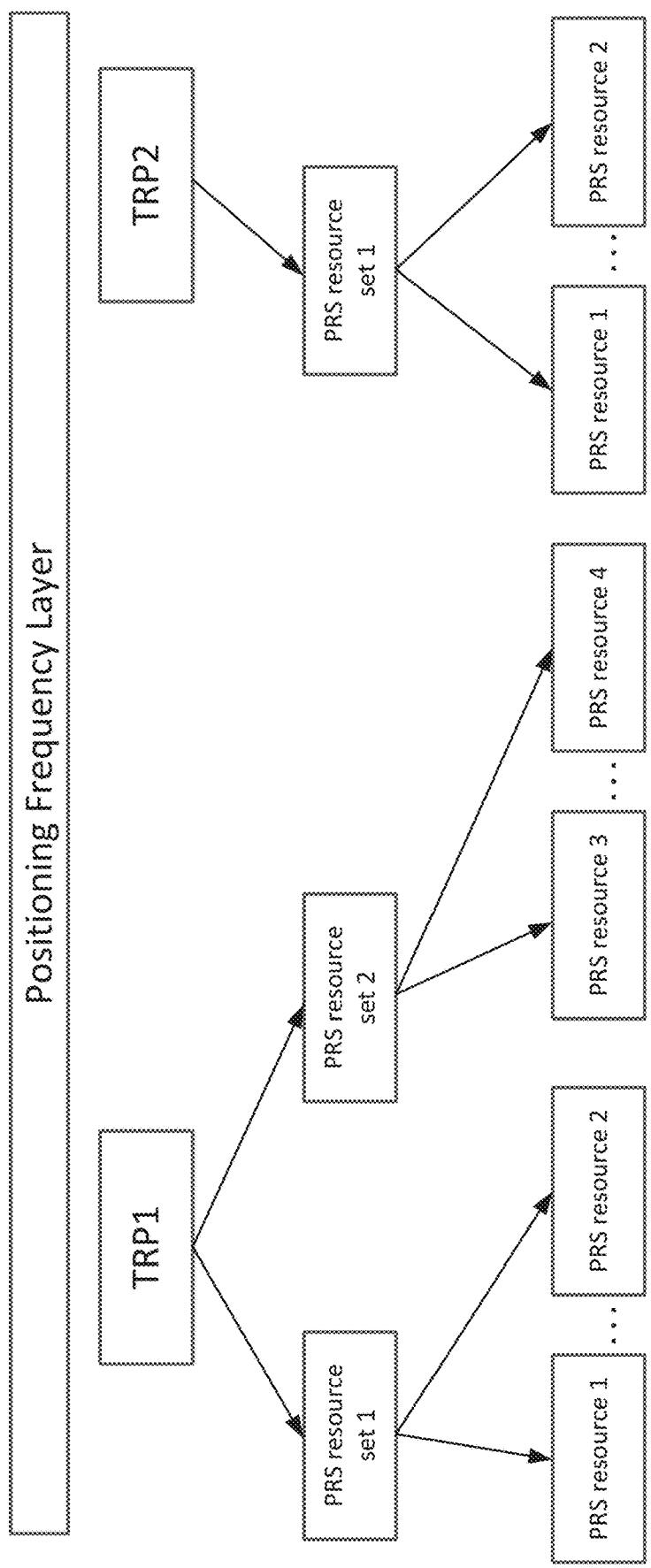
FIG. 4 is a diagram of a hierarchical structure of how PRS resources and PRS resource sets may be used by different Transmission Reception Point (TRPs) of a given position frequency layer (PFL), as defined in 5G NR.

For example, FIG. 4 is a diagram of a hierarchical structure of how PRS resources and PRS resource sets may be used by different TRPs of a given PFL, as defined in 5G NR. With respect to a network (Uu) interface, a UE 105 can be configured with one or more DL-PRS resource sets from each of one or more TRPs. Each DL-PRS resource set includes K≥1 DL-PRS resource(s), which, as previously noted, may correspond to a Tx beam of the TRP.

As previously indicated, positioning of a UE 105 (e.g., using DL-PRS configuration discussed with regard to FIG. 4) typically assumes the UE 105 is operating within a far-field operational distance from the base station 120. However, this may not always be the case for every base station 120 and UE 105.

For an antenna or antenna array (e.g., TRP(s)) larger than a half-wavelength of a radio wave it emits, near and far fields may be defined in terms of the Fraunhofer distance:

$$d_F = \frac{2D^2}{\lambda}, \quad (1)$$

where D is the largest dimension of the radiator (or the diameter of the antenna or antenna array), and λ is the wavelength of the radio wave (e.g., the carrier frequency of a transmitted RF signal). If a receiving device (e.g., UE 105) is located less than the Fraunhofer distance away from the antenna or antenna array (e.g., base station 120), then it may be considered to be within the near-field operational distance of the antenna or antenna array. Otherwise, it is considered to be in the far-field operational distance.

In a near-field scenario, an RF signal wave front arriving at the receiving device has curvature. Thus, for positioning purposes of a UE 105, this allows for different measurements to be made. For example, a unique coordinate of the UE 105 can be determined, based at least in part on the curvature. In the far-field scenario, however, the wavefront has no curvature, so traditional measurements (e.g., TDOA, RTT, AoD, and AoA) may then be used.

Embodiments herein address these and other issues by providing distance-dependent reference signal configurations where UEs at different distances from the base station (e.g., different estimated distances between the UE and the TRP) are configured with different reference signals (e.g., different DL-PRS resource sets) and/or different measurement configurations. The UE may determine measurements of the reference signals corresponding to the UE's distance from the base station according to the distance-dependent reference signal configurations. It is contemplated that the PRS used here is for illustrative purposes only. The technical scheme discussed herein may also be applied to any other suitable signals for position measurement.

Figure 5:
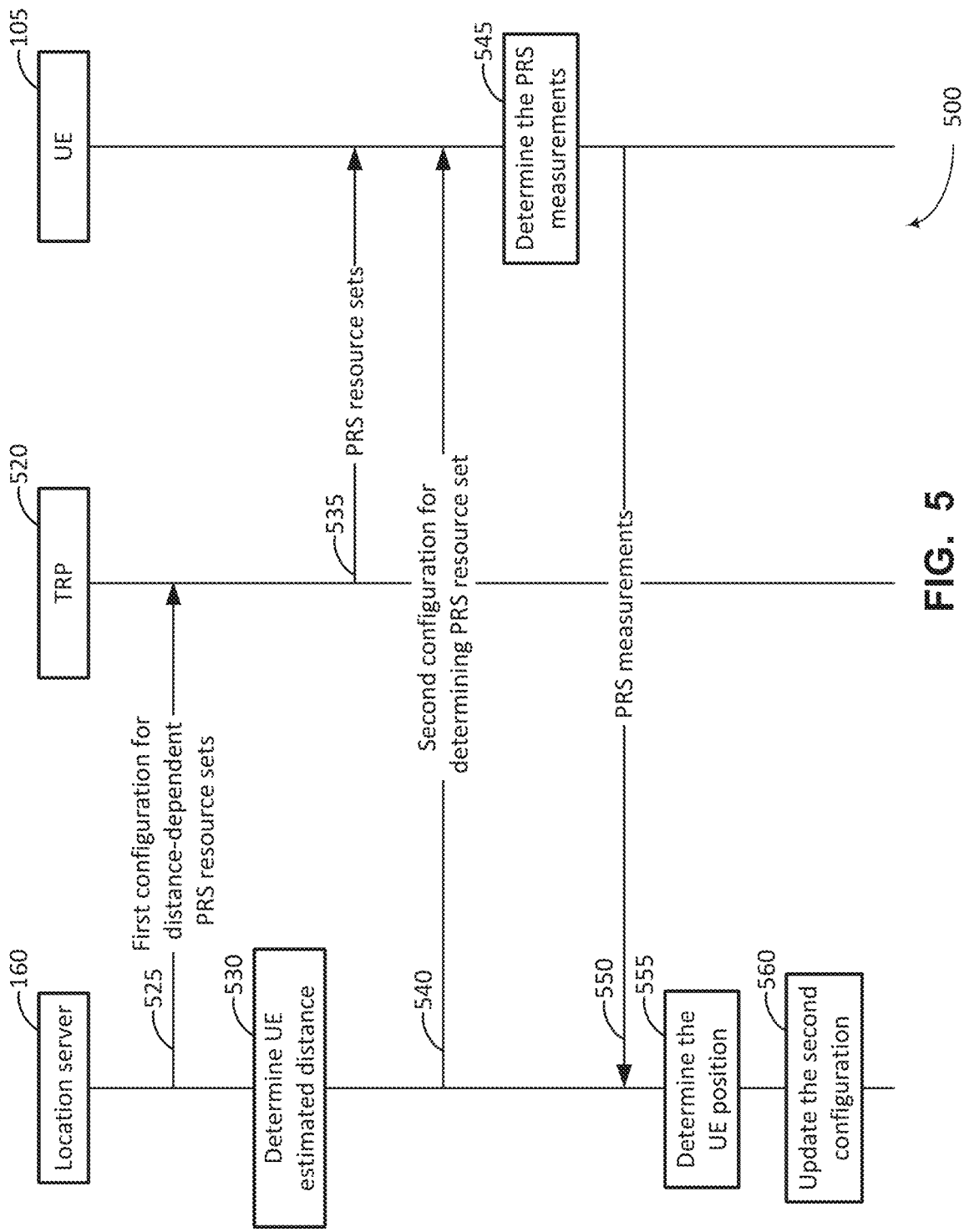
FIGS. 5, 6, and 7 are flow diagrams showing how distance-dependent positioning are performed, according to some embodiments.
Figure 6:
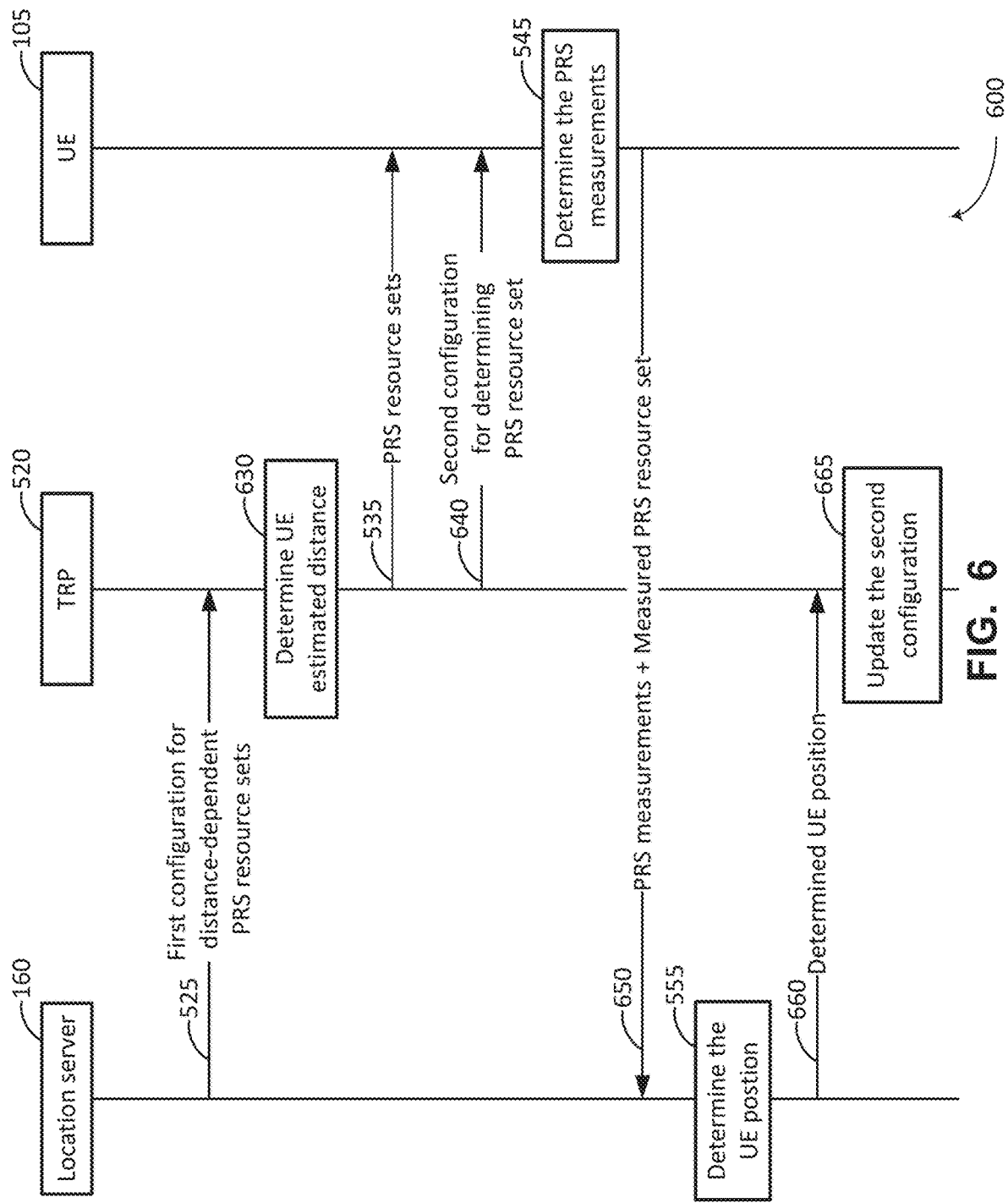
Figure 7:
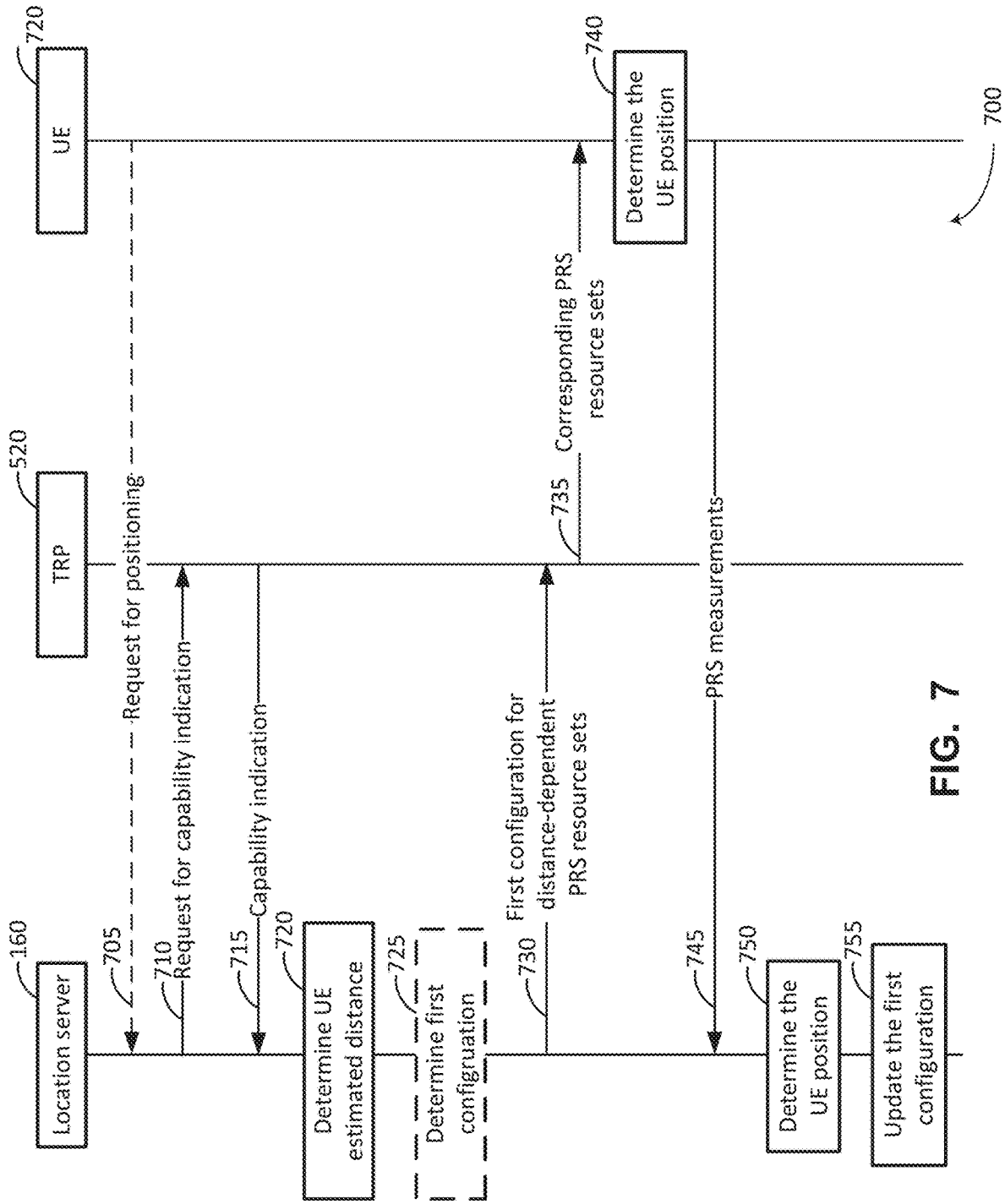

FIGS. 5, 6, and 7 are flow diagrams showing how distance-dependent positioning may be performed, according to some embodiments. In some embodiments, the distance-dependent positioning may be performed between location server 160 (e.g., LMF 220 shown in FIG. 2), a TRP 520 (e.g., the TRP of base station 120 in FIG. 1 and/or gNBs 210-1 and 210-2), and UE 105 (e.g., a target UE to be positioned). As noted above, TRP 520 may include a plurality of PRS resource sets.

In some embodiments, as illustrated in FIG. 5, when performing distance-dependent positioning 500, location server 160 may determine a configuration for the distance-dependent PRS resource sets at TRP 520, estimate a distance between UE 105 and the TRP 520, and may determine a configuration for UE 105 to determine PRS measurements based on the corresponding PRS resource set according to the estimated distance.

For example, starting from arrow 525, location server 160 may transmit a first configuration for distance-dependent PRS resource set (e.g., for configuring the PRS resource set at TRP 520 to be distance-dependent) to TRP 520. In some embodiments, the distance-dependent PRS resource set configuration (e.g., the first configuration) may be indicated in PRS assistance data. According to the distance-dependent PRS resource set configuration, the PRS resource set at TRP 520 may be configured such that the positioning of a UE at a certain distance from TRP 520 (e.g., having an estimated distance between the UE and the TRP that is within a certain range interval) may correspond to a certain PRS resource set. For example, FIG. 8 is a diagram showing an example distance-dependent PRS resource set configuration, according to some embodiments.

Figure 8:
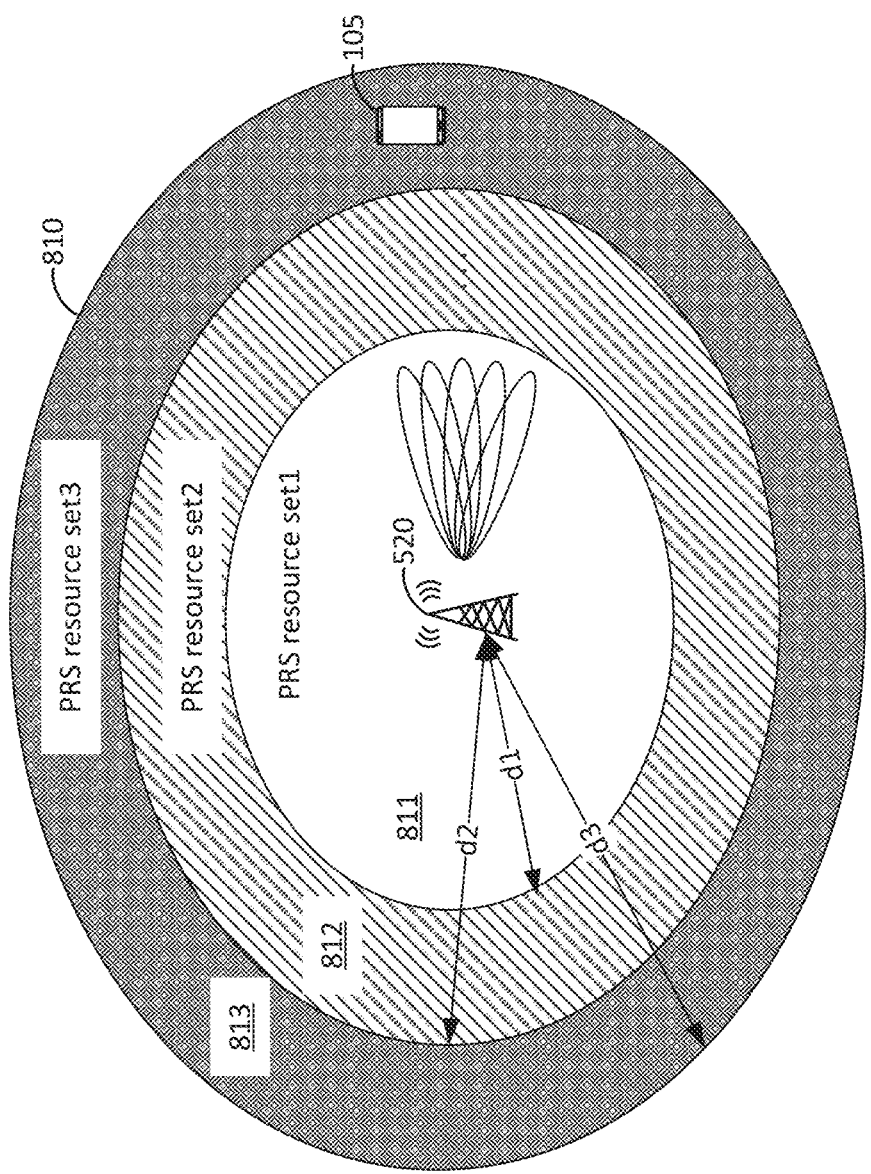
FIG. 8 is a diagram showing an example distance-dependent PRS resource set configuration, according to some embodiments.

As shown in FIG. 8, a coverage 810 (e.g., the circular region defined by a radius of d3) of TRP 520 may be mapped into different zones, e.g., zone 811, zone 812, and zone 813. For example, zone 811 may correspond to locations having a distance from TRP 520 shorter than d1 (e.g., the circular region defined by a radius of d1). Similarly, zones 812 and 813 may be defined as annulus regions having distances from TRP 520 between d1 to d2 and between d2 to d3 respectively.

According to the distance-dependent PRS resource set configuration, the PRS resource set at TRP 520 may be configured such that a first PRS resource set may correspond to positioning UEs with an estimated distance from TRP 520 within a first range interval (e.g., UEs located in zone 811), a second PRS resource set may correspond to positioning UEs with an estimated distance from TRP 520 within a second range interval (e.g., UEs located in zone 812), and a third PRS resource set ay correspond to positioning UEs with an estimated distance from TRP 520 within a third range interval (e.g., UEs located in zone 813).

According to the distance-dependent PRS resource set configuration, in some embodiments, the number of PRS resource in each PRS resource set may be different. For example, when a first PRS resource set corresponds to a first range interval and a second PRS resource set corresponds to a second range interval where the second interval is further away from TRP 520 than the first range interval, the first PRS resource set may include a smaller number of PRS resource than the second PRS resource set, on assumption that the shorter distance from TRP 520, the fewer beams are needed to cover the same field of view (FoV).

In some embodiments, each PRS resource set at TRP 520 may be configured to serve UEs at one target range interval. For example, any of the first, the second, or the third PRS resource set shown in FIG. 8 may correspond to one of zones 811, 812, or 813. However, it is noted that when requested, any PRS resource set may also be configured to serve a UE irrespectively of the UE's distance from the TRP 520, subject to expected signal gains/losses depending on the UE's estimated range/location and the requested PRS resource set.

In some embodiments, the configured PRS resource sets (e.g., the distance-dependent PRS resource sets) may be indexed corresponding to different range intervals. The indexes of the PRS resource sets may be referred to in the PRS assistance data for quoting the corresponding PRS resource set.

It is contemplated that the mapping of coverage 810 discussed herein is for illustrative purpose only. Coverage 810 of TRP 520 may also be mapped into more or less zones than shown in FIG. 8 (e.g., only mapped into a "near-field zone" and a "far-field zone"), and/or each zone may correspond to one or more PRS resource set at TRP 520 to achieve desired performance.

Referring back to FIG. 5, at block 530, location server 160 may determine an estimated distance between UE 105 and TRP 520. In some embodiments, the estimated distance between UE 105 and TRP 520 may be an approximate range knowledge, determined based on any suitable distance estimate method (e.g., RAT-dependent, non-RAT dependent, or any combination thereof). For example, the estimated distance may be determined based on GNSS-based positioning, Wi-Fi positioning reference signals received power (RSRP), enhanced cell ID (E-CID), UL-TDOA, UL-AoA, etc.

At arrow 535, TRP 520 may transmit to UE 105, the configured PRS resource sets (e.g., indexed according to the distance-dependent PRS resource set configuration received from location server 160) to UE 105. In some embodiments, the configured PRS resource sets may be transmitted based on time domain resource assignment (TDRA) or frequency domain resource assignment (FDRA).

At arrow 540, location server 160 may transmit, to UE 105, a second configuration for determining PRS measurements based on at least one PRS resource set of the distance-dependent PRS resource sets at TRP 520. In other words, the second configuration may configure UE 105 to determine PRS measurements of PRS resource set that correspond to the estimated distance between UE 105 and TRP 520. In some embodiments, as noted above, the corresponding PRS resource set may be referred to/indicated in the assistance data according to the index of the distance-dependent PRS resource set.

At block 545 UE 105 may determine the PRS measurements of the corresponding PRS resource set according to the second configuration received from location server 160. In some embodiments, the PRS measurements may include TDOA, AoD, RTT, or any other suitable measurements.

At arrow 550, UE 105 may transmit the PRS measurements to location server 160.

At block 555, location server 160 may determine the position of UE 105 based on the PRS measurements according to any suitable positioning procedures and methods (e.g., OTDOA, TDOA, RTT).

In some embodiments, at block 560, location server 160 may update the second configuration based on a location change of UE 105. In some embodiments, the location change of UE 105 may be determined based on 1. a mobility of UE 105 (e.g., the direction and the speed); 2. an updated location estimation of UE 105 (e.g., a location estimation of the current distance-dependent positioning session), or any combination thereof. In some embodiments, the location change of the UE may be indicated in an LTE included in a Radio Resource Control (RRC) message.

In some embodiments, to reduce the latency, as illustrated in FIG. 6, in distance-dependent positioning 600, TRP 520 may estimate the distance between UE 105 and the TRP 520 and may determine the configuration for UE 105 to determine PRS measurements based on the corresponding PRS resource set according to the estimated distance between UE 105 and TRP 520.

Distance-dependent positioning 600 may include processes (e.g., arrows and blocks) that are the same as or similar to the corresponding processes in distance-dependent positioning 500 except for the blocks and arrows discussed below. The shared processes will not be repeated for ease of illustration.

For example, similar to block 530 shown in FIG. 5, at block 630, TRP 520 may determine an estimated distance between UE 105 and TRP 520. In some embodiments, the estimated distance between UE 105 and TRP 520 may be an approximate range knowledge, determined based on, e.g., RSRP, timing advance (TA), or any other suitable distance estimate determination methods.

At arrow 640, different from arrow 540 shown in FIG. 5, TRP 520 may determine and transmit, to UE 105, the second configuration for determining PRS measurements based on at least one PRS resource set of the distance-dependent PRS resource sets at TRP 520. In some embodiments, as noted above, the corresponding PRS resource set may be referred to/indicated in the assistance data according to the index of the distance-dependent PRS resource set. In some embodiments, the second configuration may be communicated to UE 105 through layer 1 (L1) or layer 2 (L2) signaling.

At arrow 650, different from arrow 550 shown in FIG. 5, UE 105 may specify which PRS resource set it measured to location server 160 in the assistance data in addition to the PRS measurements.

At arrow 660, location server 160 may transmit the determined position of UE 105 to TRP 520.

At block 665, different from block 560 shown in FIG. 5, TRP 520 may update the second configuration based on a location change of UE 105. In some embodiments, the location change of UE 105 may be determined based on 1. a mobility of UE 105 (e.g., the direction and the speed); 2. an updated location estimation of UE 105 (e.g., a location estimation of the current distance-dependent positioning session), or any combination thereof. In some embodiments, the update of the second configuration may be communicated to UE 105 through L1 or L2 signaling.

In some embodiments, the distance-dependent positioning may be performed in an on-demand fashion. For example, as illustrated in FIG. 7, distance-dependent positioning 700 may be initiated by arrow 705 where UE 105 transmits a request for performing distance-dependent positioning 700.

Upon receiving the request from UE 105, in arrow 710, location server 160 may transmit, to TRP 520, a request for capability indication of TRP 520. The capability indication may include 1. whether the TRP supports an on-demand PRS transmission; 2. one or more distance intervals supported by the PRS resource sets of the TRP; 3. whether different PRS resource sets of the TRP can be transmitted (1) simultaneously, (2) together according to different time domain resource assignment (TDRA) or frequency domain resource assignment (FDRA), or only one PRS resource set at a time; or any combination thereof.

In arrow 715, TRP 520 may transmit to location server 160 the capability indication, e.g., in assistance data.

At block 720, location server 160 may determine an estimated distance between UE 105 and TRP 520. In some embodiments, the estimated distance between UE 105 and TRP 520 may be an approximate range knowledge, determined based on any suitable distance estimate method (e.g., RAT-dependent, non-RAT dependent, or any combination thereof). For example, the estimated distance may be determined based on GNSS-based positioning. Wi-Fi positioning reference signals received power (RSRP), enhanced cell ID (E-CID), UL-TDOA, UL-AoA, etc., similar to block 530 shown in FIG. 5.

At block 725, location server 160 may determine the first configuration (e.g., the distance-dependent PRS resource set configuration shown in FIG. 8) according to the capability indication received from TRP 520. Additionally and/or alternatively, the first configuration may be received from an Operations and Maintenance (O&M) server of the network for positioning UE 105.

Different from the first configuration in distance-dependent positioning 500 and/or 600, in distance-dependent positioning 700, according to the first configuration, location server 160 may configure TRP 520 to transmit certain PRS resource set that is optimized for a target range interval (e.g., the range interval the estimated distance between UE 105 and TRP 520 falls in), subject to the one or more distance intervals supported by the PRS resource sets of TRP 520 included in the capability indication. Based on the first configuration, location server 160 may configure the distance-dependent PRS resources set at TRP 520 for optimal positioning performance.

At arrow 730, location server 160 may transmit, to TRP 520, the first configuration.

At arrow 735, TRP 520 may transmit to UE 105, the PRS resource set corresponding to the estimated distance between UE 105 and TRP 520, according to the first configuration.

At block 740 and arrow 745, UE 105 may determine the PRS measurements of the corresponding PRS resource set received from TRP 520 and may transmit the PRS measurements to location server 160 respectively. In some embodiments, the PRS measurements may include TDOA, AOD, RTT, or any other suitable measurements.

At block 750, location server 160 may determine the position of UE 105 based on the PRS measurements according to any suitable positioning procedures and methods (e.g., OTDOA, TDOA, RTT).

In some embodiments, at block 755, location server 160 may update the first configuration based on a location change of UE 105, similar to block 560 shown in FIG. 5. In some embodiments, the location change of UE 105 may be determined based on 1. a mobility of UE 105 (e.g., a direction and speed); 2. an updated location estimation of UE 105 (e.g., a location estimation of the current distance-dependent positioning session), or any combination thereof. In some embodiments, the location change of the UE may be indicated in an LTE Positioning Protocol (LPP) message received from the UE. The LPP message may be included in a Radio Resource Control (RRC) message.

Figure 9:
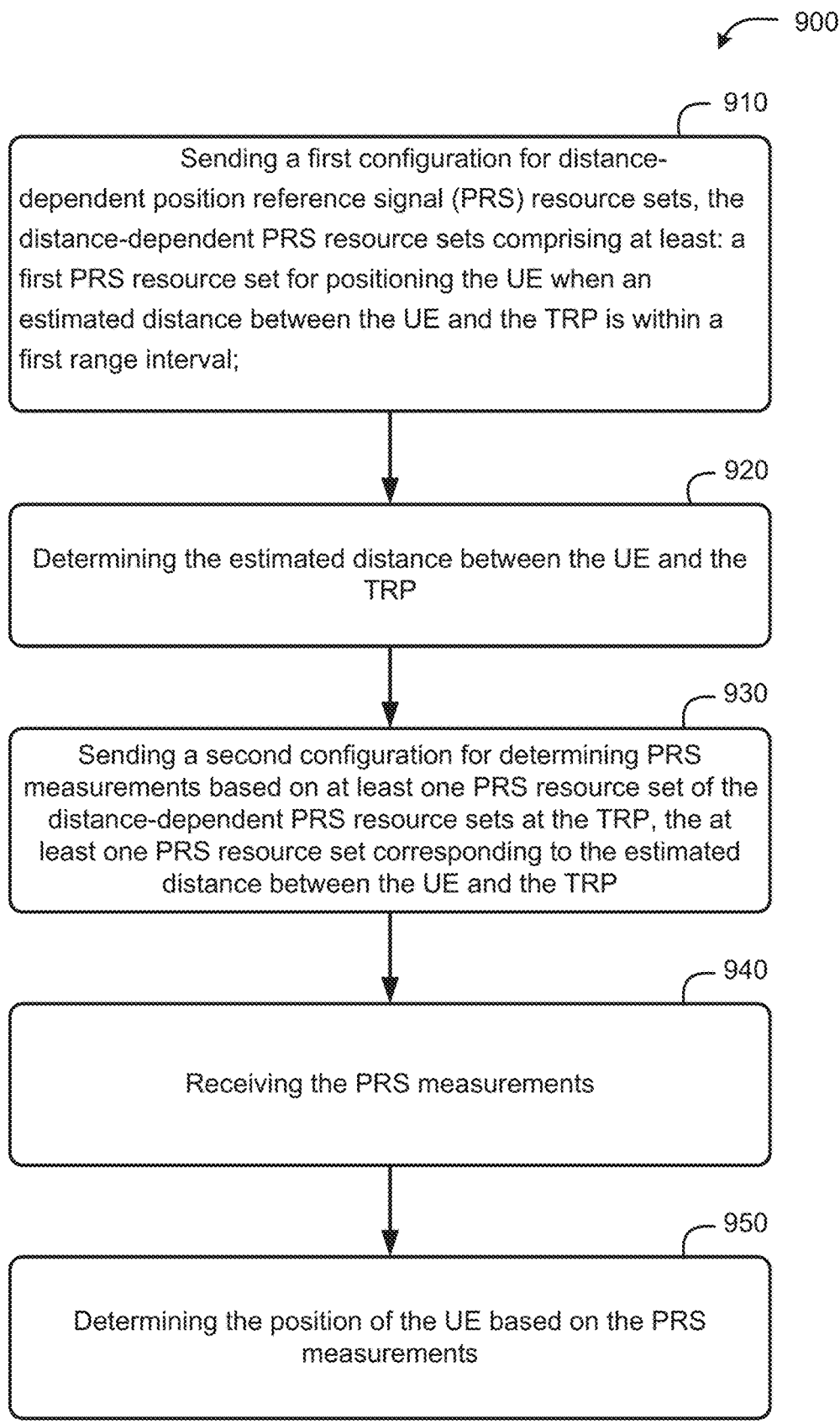
FIG. 9 is a flow diagram of a method for distance-dependent positioning of a UE performed by a location server, according to an embodiment.
Figure 11:
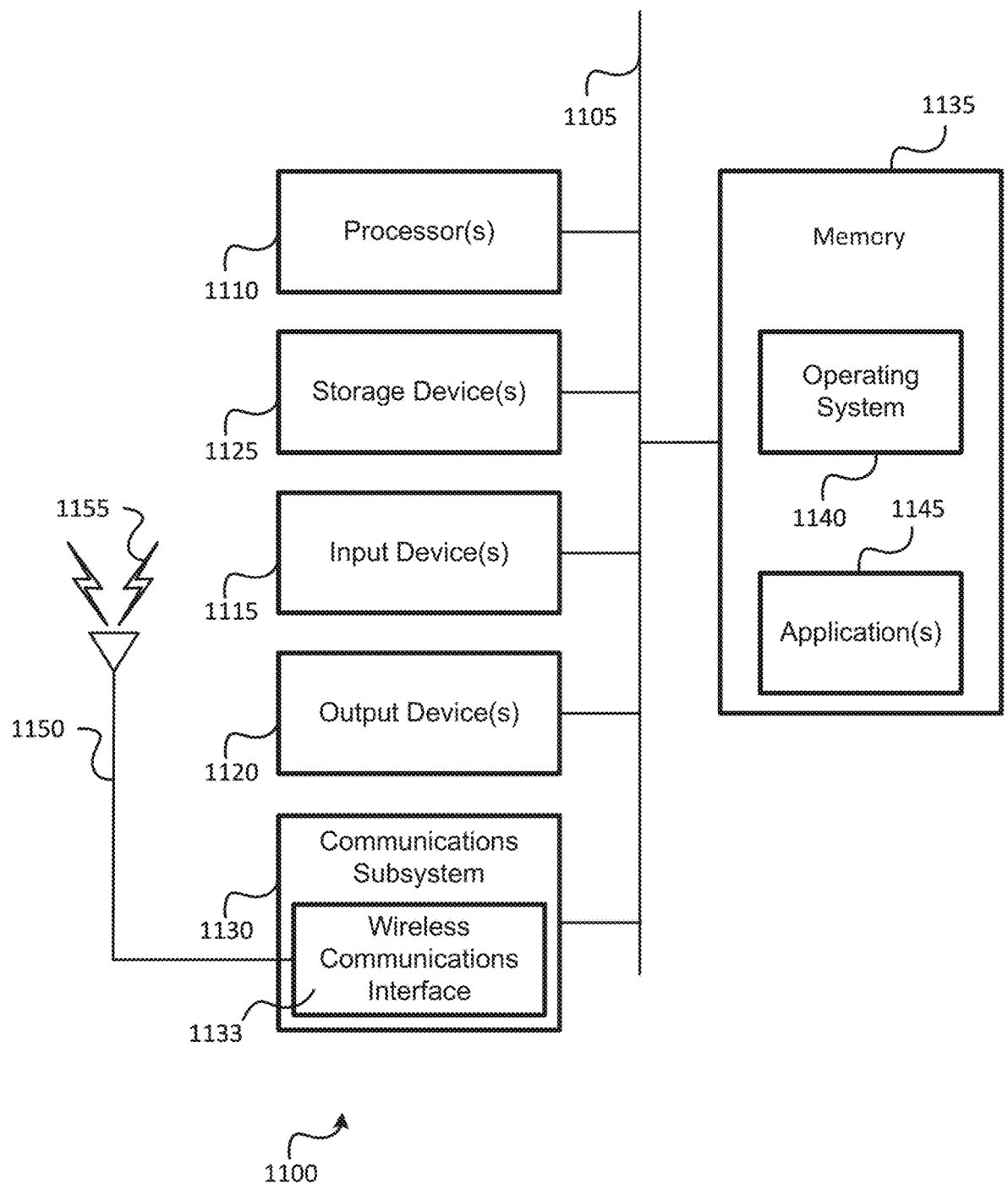
FIG. 11 is a block diagram of an embodiment of a computer system, which can be utilized in embodiments as described herein.

FIG. 9 is a flow diagram of a method 900 for distance-dependent positioning of a UE (e.g., UE 105) performed by a location server (e.g., location server 160), according to an embodiment. Means for performing the functionality illustrated in one or more of the blocks shown in FIG. 9 may be performed by hardware and/or software components of a server. Example components of a server (e.g., a computer system) are illustrated in FIG. 11, which is described in more detail below.

At block 910, the functionality comprises sending to a TRP (e.g., TRP 520 shown in any of FIG. 5, 6, or 7), a first configuration for distance-dependent position reference signal (PRS) resource sets. The distance-dependent PRS resource sets comprises at least: a first PRS resource set for positioning the UE when an estimated distance between the UE and the TRP is within a first range interval. Means for performing functionality at block 910 may comprise a bus 1105, processor(s) 1110, memory 1135, wireless communication interface 1133, and/or other components of a computer system 1100, as illustrated in FIG. 11.

In some embodiments, the distance-dependent PRS resource set configuration (e.g., the first configuration) may be indicated in PRS assistance data. According to the distance-dependent PRS resource set configuration, the PRS resource set at the TRP may be configured such that the positioning of a UE at a certain distance from the TRP (e.g., having an estimated distance between the UE and the TRP that is within a certain range interval) may correspond to a certain PRS resource set, as shown in FIG. 8. In some embodiments, when being configured, the distance-dependent PRS resource sets may comprise: a first PRS resource set for positioning the UE when an estimated distance between the UE and the TRP is within a first range interval and a second PRS resource set for positioning of the UE when an estimated distance between the UE and the TRP is within a second range interval, wherein the second range interval is further away from the TRP than the first range interval, and wherein a number of PRS resources of the first PRS resource set is smaller than a number of PRS resources of the second PRS resource set.

At block 920, the functionality comprises determining the estimated distance between the UE and the TRP. Means for performing functionality at block 920 may comprise a bus 1105, processor(s) 1110, memory 1135, wireless communication interface 1133, and/or other components of computer system 1100, as illustrated in FIG. 11. In some embodiments, the estimated distance between the UE and the TRP may be an approximate range knowledge, determined based on any suitable distance estimate method (e.g., RAT-dependent, non-RAT dependent, or any combination thereof). For example, the estimated distance may be determined based on GNSS-based positioning, Wi-Fi positioning reference signals received power (RSRP), enhanced cell ID (E-CID), UL-TDOA, UL-AoA, etc.

At block 930, the functionality comprises sending, to the UE, a second configuration for determining PRS measurements based on at least one PRS resource set of the distance-dependent PRS resource sets at the TRP, the at least one PRS resource set corresponding to the estimated distance between the UE and the TRP. Means for performing functionality at block 930 may comprise a bus 1105, processor(s) 1110, memory 1135, wireless communication interface 1133, and/or other components of a computer system 1100, as illustrated in FIG. 11.

In some embodiments, the second configuration may configure the UE to determine PRS measurements of PRS resource set that correspond to the estimated distance between the UE and the TRP. In some embodiments, as noted above, the corresponding PRS resource set may be referred to/indicated in the assistance data according to the index of the distance-dependent PRS resource set.

At block 940, the functionality comprises receiving, from the UE, the PRS measurements. Means for performing functionality at block 940 may comprise a bus 1105, processor(s) 1110, memory 1135, wireless communication interface 1133, and/or other components of a computer system 1100, as illustrated in FIG. 11. In some embodiments, the PRS measurements may include TDOA, AoD, RTT, or any other suitable measurements.

At block 950, the functionality comprises determining the position of the UE based on the PRS measurements according to any suitable positioning procedures and methods (e.g., OTDOA, TDOA, RTT). Means for performing functionality at block 950 may comprise a bus 1105, processor(s) 1110, memory 1135, wireless communication interface 1133, and/ or other components of a computer system 1100, as illustrated in FIG. 11.

In some embodiments, method 900 may further comprise updating the second configuration based on a location change of the UE. In some embodiments, the location change of the UE may be determined based on 1. a mobility of UE 105 (e.g., the direction and the speed); 2. an updated location estimation of UE 105 (e.g., a location estimation of the current distance-dependent positioning session), or any combination thereof. In some embodiments, the location change of the UE may be indicated in an LTE included in a Radio Resource Control (RRC) message.

As noted above, the distance-dependent positioning of the UE may be initiated by the UE by receiving a positioning request from the UE (e.g., performed in an on-demand fashion). Accordingly, in some embodiments, method 900 may also comprise prior to sending the first configuration to the TRP, receiving, from the TRP, capability indication for: whether the TRP supports an on-demand PRS transmission; one or more distance intervals supported by the PRS resource sets of the TRP; whether different PRS resource sets of the TRP can be transmitted simultaneously; or any combination thereof, wherein sending the first configuration to the TRP is responsive to: 1. the TRP supports the on-demand PRS transmission; and 2. receiving a positioning request from the UE.

In some embodiments, method 900 may also comprise receiving the first configuration from an Operations and Maintenance (O&M) server of the network for positioning UE 105.

Figure 10:
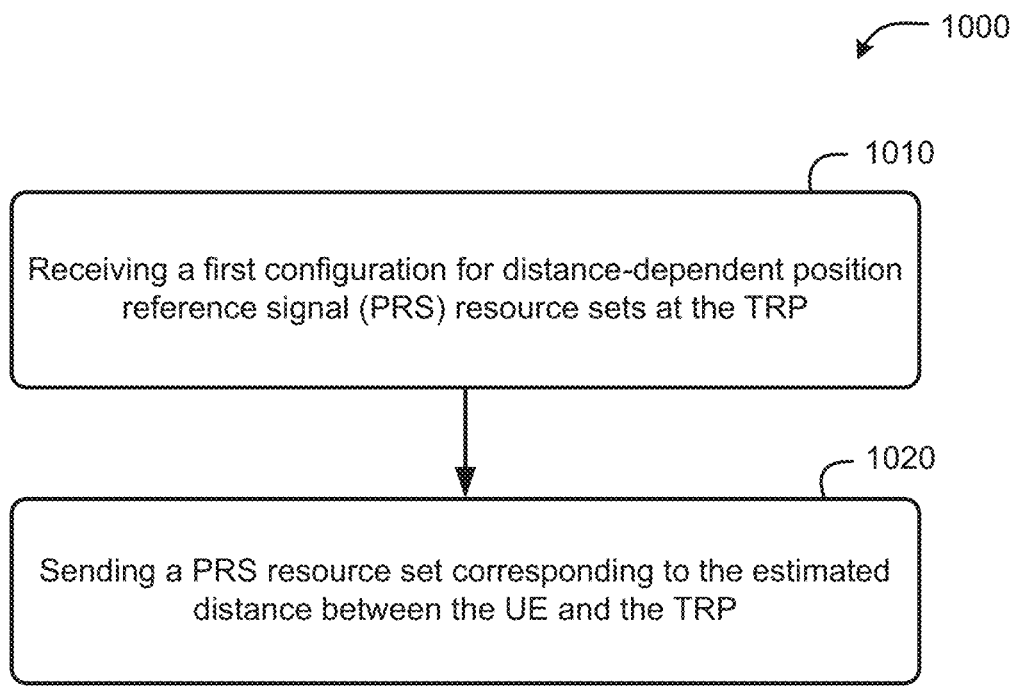
FIG. 10 is a flow diagram of a method for distance-dependent positioning of a UE performed by a transmission/reception point (TRP) TRP, according to an embodiment.
Figure 12:
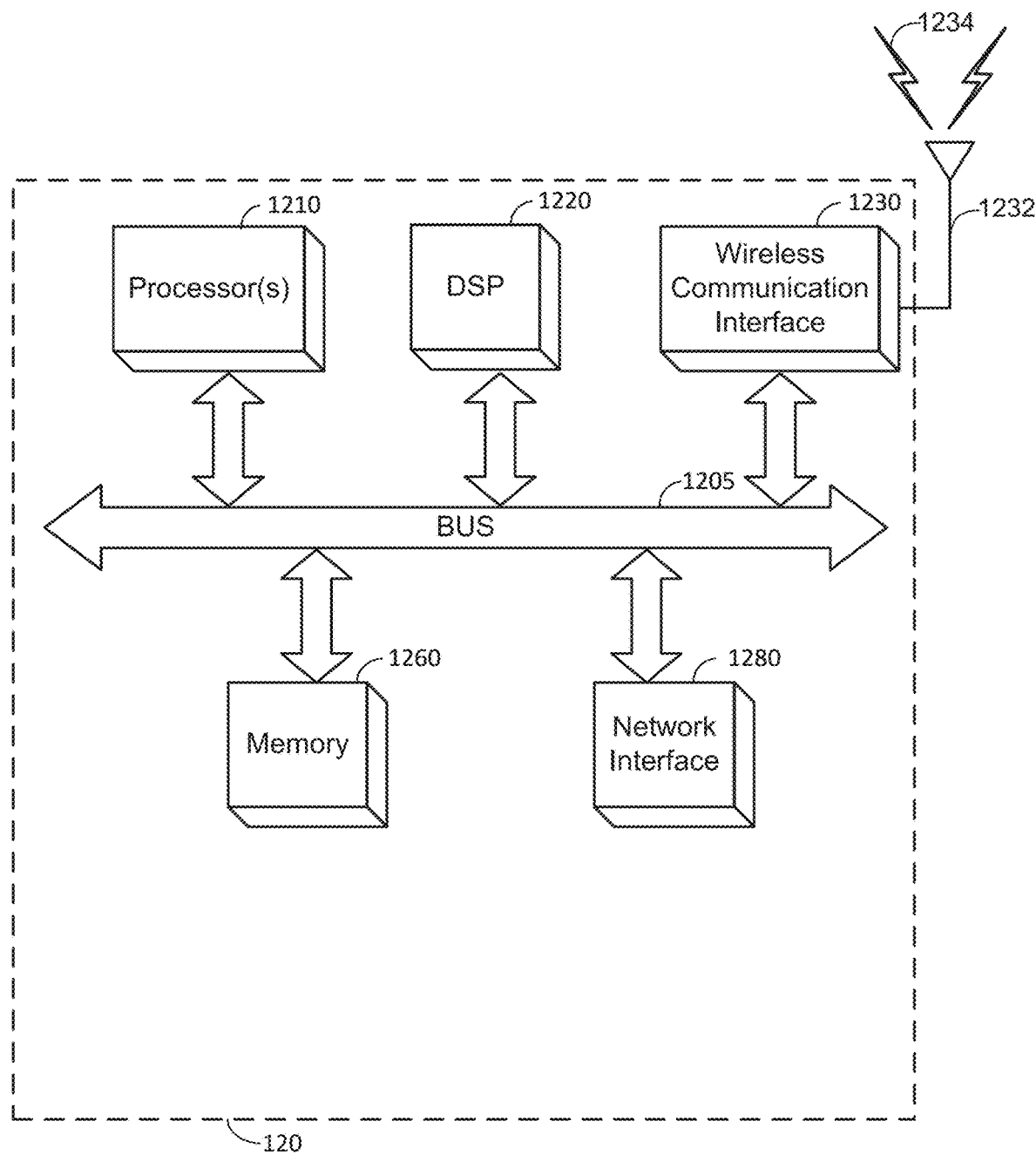
FIG. 12 is a block diagram of an embodiment of a base station, which can be utilized in embodiments as described herein.

FIG. 10 is a flow diagram of a method 1000 for distance-dependent positioning of a UE (e.g., UE 105) performed by a transmission/reception point (TRP) TRP (e.g., TRP 520 shown in any of FIG. 5, 6, or 7), according to an embodiment. Means for performing the functionality illustrated in one or more of the blocks shown in FIG. 9 may be performed by hardware and/or software components of a base station. Example components of a base station are illustrated in FIG. 12, which is described in more detail below.

At block 1010, the functionality comprises receiving, from a location server, a first configuration for distance-dependent position reference signal (PRS) resource sets at the TRP. The distance-dependent PRS resource sets comprises at least: a first PRS resource set for positioning the UE when an estimated distance between the UE and the TRP is within a first range interval. Means for performing functionality at block 1010 may comprise a bus 1205, processor(s) 1210, memory 1260, wireless communication interface 1230, and/or other components of base station 120, as illustrated in FIG. 12.

At block 1020, the functionality comprises sending, to the UE, a PRS resource set corresponding to the estimated distance between the UE and the TRP. Means for performing functionality at block 1020 may comprise a bus 1205, processor(s) 1210, memory 1260, wireless communication interface 1230, and/or other components of base station 120, as illustrated in FIG. 12. In some embodiments, the configured PRS resource sets may be transmitted based on time domain resource assignment (TDRA) or frequency domain resource assignment (FDRA).

In some embodiments, method 1000 further comprises sending, to the location server, capability indication for: 1. whether the TRP supports an on-demand PRS transmission; 2. one or more distance intervals supported by the PRS resource sets of the TRP; 3. whether different PRS resource sets of the TRP can be transmitted (1) simultaneously, (2) together according to different time domain resource assignment (TDRA) or frequency domain resource assignment (FDRA), or only one PRS resource set at a time; or any combination thereof.

In some embodiments, method 1000 further comprises determining the estimated distance between the UE and the TRP based on reference signals received power (RSRP), timing advance (TA), or any other suitable distance estimate methods.

In some embodiments, method 1000 further comprises sending, to the UE, a second configuration for determining PRS measurements based on the PRS resource set corresponding to the estimated distance between the UE and the TRP.

In some embodiments, method 1000 further comprises updating the second configuration based on a location change of the UE. In some embodiments, the location change of UE 105 may be determined based on 1. a mobility of UE 105 (e.g., a direction and speed); 2. an updated location estimation of UE 105 (e.g., a location estimation of the current distance-dependent positioning session), or any combination thereof. In some embodiments, the location change of the UE may be indicated in an LTE Positioning Protocol (LPP) message received from the UE. The LPP message may be included in a Radio Resource Control (RRC) message.

In some embodiments, method 1000 further comprises sending to the UE, a physical layer message or a media access control (MAC) message indicating the updated second configuration.

FIG. 11 is a block diagram of an embodiment of a computer system 1100, which may be used, in whole or in part, to provide the functions of one or more network components as described in the embodiments herein (e.g., location server 160 of FIGS. 1, 2, 5-10). It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner. In addition, it can be noted that components illustrated by FIG. 11 can be localized to a single device and/or distributed among various networked devices, which may be disposed at different geographical locations.

The computer system 1100 is shown comprising hardware elements that can be electrically coupled via a bus 1105 (or may otherwise be in communication, as appropriate). The hardware elements may include processor(s) 1110, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1100 also may comprise one or more input devices 1115, which may comprise without limitation a mouse, a keyboard, a camera, a microphone, and/or the like; and one or more output devices 1120, which may comprise without limitation a display device, a printer, and/or the like.

The computer system 1100 may further include (and/or be in communication with) one or more non-transitory storage devices 1125, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1100 may also include a communications subsystem 1130, which may comprise wireless communication technologies managed and controlled by a wireless communication interface 1133, as well as wired technologies (such as Ethernet, coaxial communications, universal serial bus (USB), and the like). The wireless communication interface 1133 may comprise one or more wireless transceivers that may send and receive wireless signals 1155 (e.g., signals according to 5G NR or LTE) via wireless antenna(s) 1150. Thus the communications subsystem 1130 may comprise a modem, a network card (wireless or wired), an infrared communication device, a wireless communication device, and/or a chipset, and/or the like, which may enable the computer system 1100 to communicate on any or all of the communication networks described herein to any device on the respective network, including a User Equipment (UE), base stations and/or other TRPs, and/or any other electronic devices described herein. Hence, the communications subsystem 1130 may be used to receive and send data as described in the embodiments herein.

In many embodiments, the computer system 1100 will further comprise a working memory 1135, which may comprise a RAM or ROM device, as described above. Software elements, shown as being located within the working memory 1135, may comprise an operating system 1140, device drivers, executable libraries, and/or other code, such as one or more applications 1145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1125 described above. In some cases, the storage medium might be incorporated within a computer system, such as computer system 1100. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.), then takes the form of executable code.

FIG. 12 is a block diagram of an embodiment of a base station 120, which can be utilized as described herein above (e.g., in association with FIGS. 1-3 and 5-10). It should be noted that FIG. 12 is meant only to provide a generalized illustration of various components, any or all of which may be utilized as appropriate. In some embodiments, the base station 120 may correspond to a gNB, an ng-eNB, and/or (more generally) a TRP.

The base station 120 is shown comprising hardware elements that can be electrically coupled via a bus 1205 (or may otherwise be in communication, as appropriate). The hardware elements may include a processor(s) 1210 which can include without limitation one or more general-purpose processors, one or more special-purpose processors (such as DSP chips, graphics acceleration processors, ASICs, and/or the like), and/or other processing structure or means. As shown in FIG. 12, some embodiments may have a separate DSP 1220, depending on desired functionality. Location determination and/or other determinations based on wireless communication may be provided in the processor(s) 1210 and/or wireless communication interface 1230 (discussed below), according to some embodiments. The base station 120 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 120 might also include a wireless communication interface 1230, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 120 to communicate as described herein. The wireless communication interface 1230 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna (s) 1232 that send and/or receive wireless signals 1234.

The base station 120 may also include a network interface 1280, which can include support of wireline communication technologies. The network interface 1280 may include a modem, network card, chipset, and/or the like. The network interface 1280 may include one or more input and/or output communication interfaces to permit data to be exchanged with a network, communication network servers, computer systems, and/or any other electronic devices described herein.

In many embodiments, the base station 120 may further comprise a memory 1260. The memory 1260 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1260 of the base station 120 also may comprise software elements (not shown in FIG. 12), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1260 that are executable by the base station 120 (and/or processor(s) 1210 or DSP 1220 within base station 120). In some embodiments, then, such code and/or instructions can be used to configure and/or adapt a general-purpose computer (or other device) to perform one or more operations in accordance with the described methods.

Figure 13:
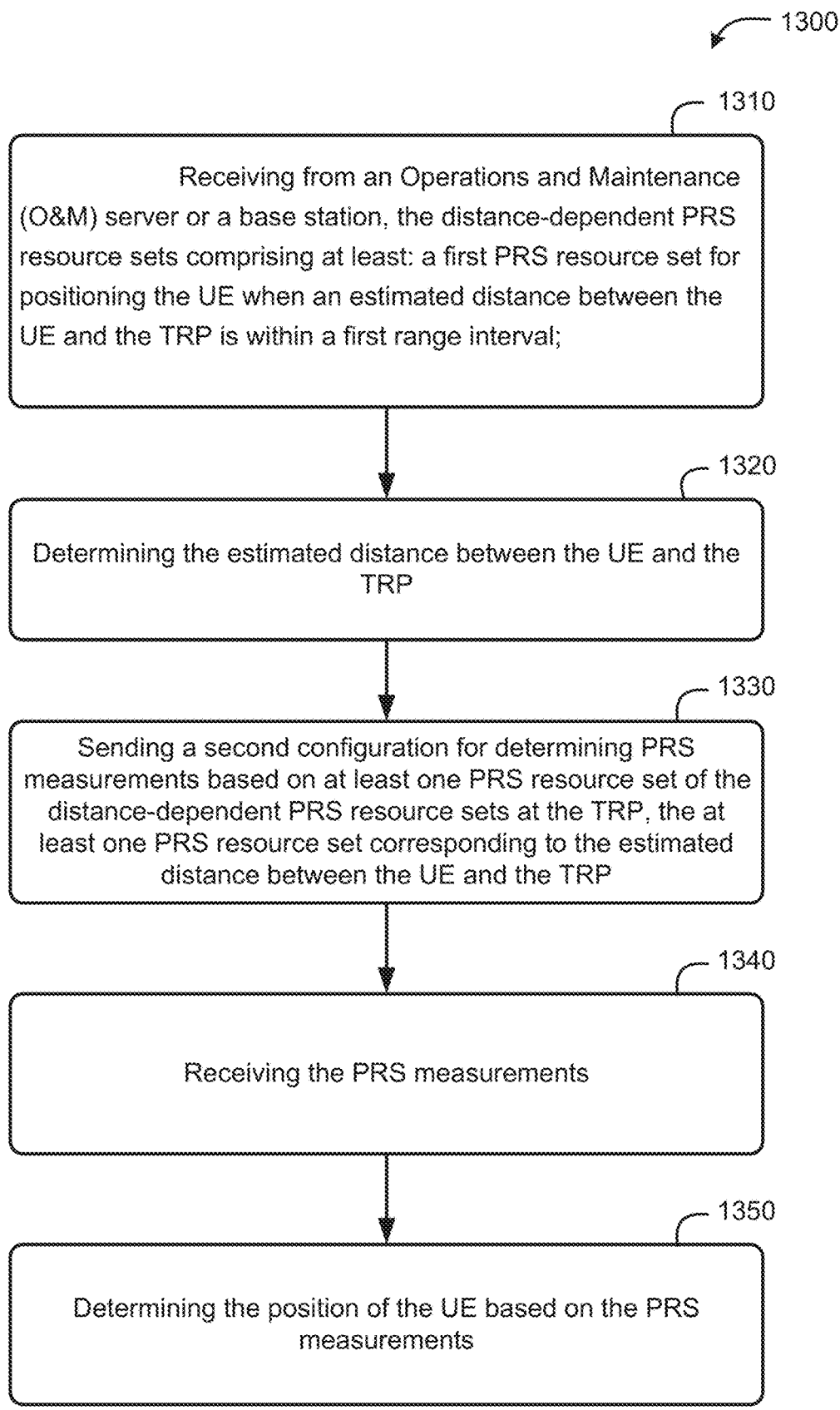
FIG. 13 is a flow diagram of a method for distance-dependent positioning of a UE performed by a location server, according to an embodiment.

FIG. 13 is a flow diagram of a method 1300 for distance-dependent positioning of a UE (e.g., UE 105) performed by a location server (e.g., location server 160), according to an embodiment. Means for performing the functionality illustrated in one or more of the blocks shown in FIG. 13 may be performed by hardware and/or software components of a server. Example components of a server (e.g., a computer system) are illustrated in FIG. 11, which is described in more detail below.

At block 1310, the functionality comprises receiving, from an Operations and Maintenance (O&M) server or a base station, a first configuration for distance-dependent position reference signal (PRS) resource sets, a first configuration for distance-dependent position reference signal (PRS) resource sets. The distance-dependent PRS resource sets comprises at least: a first PRS resource set for positioning the UE when an estimated distance between the UE and a TRP of the base station (e.g., TRP 520 shown in any of FIG. 5, 6, or 7) is within a first range interval. Means for performing functionality at block 1310 may comprise a bus 1105, processor(s) 1110, memory 1135, wireless communication interface 1133, and/or other components of a computer system 1100, as illustrated in FIG. 11.

In some embodiments, the distance-dependent PRS resource set configuration (e.g., the first configuration) may be indicated in PRS assistance data. According to the distance-dependent PRS resource set configuration, the PRS resource set at the TRP may be configured such that the positioning of a UE at a certain distance from the TRP (e.g., having an estimated distance between the UE and the TRP that is within a certain range interval) may correspond to a certain PRS resource set, as shown in FIG. 8. In some embodiments, when being configured, the distance-dependent PRS resource sets may comprise: a first PRS resource set for positioning the UE when an estimated distance between the UE and the TRP is within a first range interval and a second PRS resource set for positioning of the UE when an estimated distance between the UE and the TRP is within a second range interval, wherein the second range interval is further away from the TRP than the first range interval, and wherein a number of PRS resources of the first PRS resource set is smaller than a number of PRS resources of the second PRS resource set.

At block 1320, the functionality comprises determining the estimated distance between the UE and the TRP. Means for performing functionality at block 1320 may comprise a bus 1105, processor(s) 1110, memory 1135, wireless communication interface 1133, and/or other components of computer system 1100, as illustrated in FIG. 11. In some embodiments, the estimated distance between the UE and the TRP may be an approximate range knowledge, determined based on e.g., reference signals received power (RSRP) or enhanced cell ID (E-CID).

At block 1330, the functionality comprises sending, to the UE, a second configuration for determining PRS measurements based on at least one PRS resource set of the distance-dependent PRS resource sets at the TRP, the at least one PRS resource set corresponding to the estimated distance between the UE and the TRP. Means for performing functionality at block 1330 may comprise a bus 1105, processor (s) 1110, memory 1135, wireless communication interface 1133, and/or other components of a computer system 1100, as illustrated in FIG. 11.

In some embodiments, the second configuration may configure the UE to determine PRS measurements of PRS resource set that correspond to the estimated distance between the UE and the TRP. In some embodiments, as noted above, the corresponding PRS resource set may be referred to/indicated in the assistance data according to the index of the distance-dependent PRS resource set.

At block 1340, the functionality comprises receiving, from the UE, the PRS measurements. Means for performing functionality at block 1340 may comprise a bus 1105, processor(s) 1110, memory 1135, wireless communication interface 1133, and/or other components of a computer system 1100, as illustrated in FIG. 11. In some embodiments, the PRS measurements may include TDOA, AoD, RTT, or any other suitable measurements.

At block 1350, the functionality comprises determining the position of the UE based on the PRS measurements according to any suitable positioning procedures and methods (e.g., OTDOA, TDOA, RTT). Means for performing functionality at block 1350 may comprise a bus 1105, processor(s) 1110, memory 1135, wireless communication interface 1133, and/or other components of a computer system 1100, as illustrated in FIG. 11.

In some embodiments, method 1300 may further comprise updating the second configuration based on a location change of the UE. In some embodiments, the location change of the UE may be determined based on 1. a mobility of UE 105 (e.g., the direction and the speed); 2. an updated location estimation of UE 105 (e.g., a location estimation of the current distance-dependent positioning session), or any combination thereof. In some embodiments, the location change of the UE may be indicated in an LTE Positioning Protocol (LPP) message received from UE 105. The LPP message may be included in a Radio Resource Control (RRC) message.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method for distance-dependent positioning of a user device (UE) performed by a location server, the method comprising: sending, to a transmission/reception point (TRP), a first configuration for distance-dependent position reference signal (PRS) resource sets, the distance-dependent PRS resource sets comprising at least: a first PRS resource set for positioning the UE when an estimated distance between the UE and the TRP is within a first range interval. The method also comprises determining the estimated distance between the UE and the TRP and sending, to the UE, a second configuration for determining PRS measurements based on at least one PRS resource set of the distance-dependent PRS resource sets at the TRP, the at least one PRS resource set corresponding to the estimated distance between the UE and the TRP. The method further comprises receiving, from the UE, the PRS measurements; and determining the position of the UE based on the PRS measurements.

Clause 2. The method of clause 1, further comprising: prior to sending the first configuration to the TRP, receiving, from the TRP, capability indication for: whether the TRP supports an on-demand PRS transmission; one or more distance intervals supported by the PRS resource sets of the TRP; whether different PRS resource sets of the TRP can be transmitted simultaneously; or any combination thereof, wherein sending the first configuration to the TRP is responsive to: 1. the TRP supports the on-demand PRS transmission; and 2. receiving a positioning request from the UE.

Clause 3. The method of clause 1 or 2, further comprising: receiving, from an Operations and Maintenance (O&M) server, the first configuration.

Clause 4. The method of any of clauses 1-3, wherein the distance-dependent PRS resource sets further comprise: a second PRS resource set for positioning of the UE when an estimated distance between the UE and the TRP is within a second range interval, wherein the second range interval is further away from the TRP than the first range interval, and wherein a number of PRS resources of the first PRS resource set is smaller than a number of PRS resources of the second PRS resource set.

Clause 5. The method of any of clauses 1-4, wherein the second configuration is indicated in PRS assistance data transmitted from the location server to the UE.

Clause 6. The method of any of clauses 1-5, further comprising: updating the second configuration based on a location change of the UE.

Clause 7. The method of any of clauses 1-6, wherein the location change of the UE is determined based on: a mobility of the UE; an updated location estimation of the UE; or any combination thereof.

Clause 8. The method of any of clauses 1-7, wherein the location change of the UE is indicated in an LTE Positioning Protocol (LPP) message received from the UE.

Clause 9. A method for distance-dependent positioning of a user device (UE) performed by a transmission/reception point (TRP), the method comprising: receiving, from a location server, a first configuration for distance-dependent position reference signal (PRS) resource sets at the TRP, wherein the distance-dependent PRS resource sets comprising at least: a first PRS resource set for positioning the UE when an estimated distance between the UE and the TRP is within a first range interval. The method also comprises sending, to the UE, a PRS resource set corresponding to the estimated distance between the UE and the TRP.

Clause 10. The method of clause 9, further comprising: sending, to the location server, capability indication for: whether the TRP supports an on-demand PRS transmission; one or more distance intervals supported by the PRS resource sets of the TRP; whether different PRS resource sets of the TRP can be transmitted simultaneously; or any combination thereof, wherein receiving the first configuration from the location server is responsive to: 1. the TRP supports the on-demand PRS transmission; and 2. the location receives a positioning request from the UE.

Clause 11. The method of clause 9 or 10, further comprising: sending, to the UE, a second configuration for determining PRS measurements based on the PRS resource set corresponding to the estimated distance between the UE and the TRP.

Clause 12. The method of any of clauses 9-11, further comprising: updating the second configuration based on a location change of the UE.

Clause 13. The method of any of clauses 9-12, further comprising: sending, to the UE, a physical layer message or a media access control (MAC) message indicating the updated second configuration Clause 14. The method of any of clauses 9-13, wherein the location change of the UE is determined based on: a mobility of the UE; an updated location estimation of the UE; or any combination thereof.

Clause 15. The method of any of clauses 9-14, further comprising: transmitting, to the UE, a plurality of distance-dependent PRS resource sets at the TRP based on time domain resource assignment (TDRA) or frequency domain resource assignment (FDRA).

Clause 16. A method for distance-dependent positioning of a user device (UE) performed by a location server, the method comprising: receiving, from an Operations and Maintenance (O&M) server or a base station, a first configuration for distance-dependent position reference signal (PRS) resource sets, the distance-dependent PRS resource sets comprising at least: a first PRS resource set for positioning the UE when an estimated distance between the UE and a TRP of the base station is within a first range interval. The method also comprises determining the estimated distance between the UE and the TRP and sending, to the UE, a second configuration for determining PRS measurements based on at least one PRS resource set of the distance-dependent PRS resource sets at the TRP, the at least one PRS resource set corresponding to the estimated distance between the UE and the TRP. The method further comprises receiving, from the UE, the PRS measurements; and determining the position of the UE based on the PRS measurements.

Clause 17. The method of clause 16, wherein the distance-dependent PRS resource sets further comprise: a second PRS resource set for positioning of the UE when an estimated distance between the UE and the TRP is within a second range interval, wherein the second range interval is further away from the TRP than the first range interval, and wherein a number of PRS resources of the first PRS resource set is smaller than a number of PRS resources of the second PRS resource set.

Clause 18. The method of any of clause 16 or 17, wherein the second configuration is indicated in PRS assistance data transmitted from the location server to the UE.

Clause 19. The method of any of clauses 16-18, further comprising: updating the second configuration based on a location change of the UE.

Clause 20. The method of any of clauses 16-19, wherein the location change of the UE is determined based on: a mobility of the UE; an updated location estimation of the UE; or any combination thereof.

Clause 21. A location server comprising: one or more transceivers, a memory, and one or more processors communicatively coupled with the one or more transceivers and the memory, wherein the one or more processors are configured to: send, to a transmission/reception point (TRP), a first configuration for distance-dependent position reference signal (PRS) resource sets, the distance-dependent PRS resource sets comprising at least: a first PRS resource set for positioning the UE when an estimated distance between the UE and the TRP is within a first range interval. The one or more processors are also configured to determine the estimated distance between the UE and the TRP and send, to the UE, a second configuration for determining PRS measurements based on at least one PRS resource set of the distance-dependent PRS resource sets at the TRP, the at least one PRS resource set corresponding to the estimated distance between the UE and the TRP. The one or more processors are further configured to receive, from the UE, the PRS measurements; and determine the position of the UE based on the PRS measurements.

Clause 22. The location server of clause 21, wherein the one or more processors are further configured to: prior to sending the first configuration to the TRP, receive, from the TRP, capability indication for: whether the TRP supports an on-demand PRS transmission; one or more distance intervals supported by the PRS resource sets of the TRP; whether different PRS resource sets of the TRP can be transmitted simultaneously; or any combination thereof, wherein sending the first configuration to the TRP is responsive to: 1. the TRP supports the on-demand PRS transmission; and 2. receiving a positioning request from the UE.

Clause 23. The location server of any of clause 21 or 22, wherein the one or more processors are further configured to: receive, from an Operations and Maintenance (O&M) server, the first configuration.

Clause 24. The location server of any of clauses 21-23, wherein the distance-dependent PRS resource sets further comprise: a second PRS resource set for positioning of the UE when an estimated distance between the UE and the TRP is within a second range interval, wherein the second range interval is further away from the TRP than the first range interval, and wherein a number of PRS resources of the first PRS resource set is smaller than a number of PRS resources of the second PRS resource set.

Clause 25. The location server of any of clauses 21-24, wherein the second configuration is indicated in PRS assistance data transmitted from the location server to the UE.

Clause 26. The location server of any of clauses 21-25, wherein the one or more processors are further configured to: update the second configuration based on a location change of the UE.

Clause 27. The location server of any of clauses 21-26, wherein the location change of the UE is determined based on: a mobility of the UE; an updated location estimation of the UE; or any combination thereof.

Clause 28. The location server of any of clauses 21-27, wherein the location change of the UE is indicated in an LTE Positioning Protocol (LPP) message received from the UE.

Clause 29. A system comprising: one or more transceivers, a memory, and one or more processors communicatively coupled with the one or more transceivers and the memory, wherein the one or more processors are configured to: receive, from a location server, a first configuration for distance-dependent position reference signal (PRS) resource sets at a transmission/reception point (TRP) of the system, wherein the distance-dependent PRS resource sets comprising at least: a first PRS resource set for positioning the UE when an estimated distance between the UE and the TRP is within a first range interval. The one or more processors are also configured to send, to the UE, a PRS resource set corresponding to the estimated distance between the UE and the TRP.

Clause 30. The system of clause 29, wherein the one or more processors are further configured to: send, to the location server, capability indication for: whether the TRP supports an on-demand PRS transmission; one or more distance intervals supported by the PRS resource sets of the TRP; whether different PRS resource sets of the TRP can be transmitted simultaneously; or any combination thereof, wherein receiving the first configuration from the location server is responsive to: 1. the TRP supports the on-demand PRS transmission; and 2. the location receives a positioning request from the UE.

Clause 31. The system of any of clause 29 or 30, wherein the one or more processors are further configured to: send, to the UE, a second configuration for determining PRS measurements based on the PRS resource set corresponding to the estimated distance between the UE and the TRP.

Clause 32. The system of any of clauses 29-31, wherein the one or more processors are further configured to: update the second configuration based on a location change of the UE.

Clause 33. The system of any of clauses 29-32, further comprising: send, to the UE, a physical layer message or a media access control (MAC) message indicating the updated second configuration.

Clause 34. The system of any of clauses 29-33, wherein the location change of the UE is determined based on: a mobility of the UE; an updated location estimation of the UE; or any combination thereof.

Clause 35. The system of any of clauses 29-34, wherein the one or more processors are further configured to: transmit, to the UE, a plurality of distance-dependent PRS resource sets at the TRP based on time domain resource assignment (TDRA) or frequency domain resource assignment (FDRA).

Clause 36. A location server comprising: one or more transceivers, a memory, and one or more processors communicatively coupled with the one or more transceivers and the memory, wherein the one or more processors are configured to: receive, from an Operations and Maintenance (O&M) server or a base station, a first configuration for distance-dependent position reference signal (PRS) resource sets, the distance-dependent PRS resource sets comprising at least: a first PRS resource set for positioning the UE when an estimated distance between the UE and a TRP of the base station is within a first range interval. The one or more processors are also configured to determine the estimated distance between the UE and the TRP. The one or more processors are also configured to send, to the UE, a second configuration for determining PRS measurements based on at least one PRS resource set of the distance-dependent PRS resource sets at the TRP, the at least one PRS resource set corresponding to the estimated distance between the UE and the TRP. The one or more processors are also configured to receive, from the UE, the PRS measurements. The one or more processors are further configured to determine the position of the UE based on the PRS measurements.

Clause 37. The location server of clause 36, wherein the distance-dependent PRS resource sets further comprise: a second PRS resource set for positioning of the UE when an estimated distance between the UE and the TRP is within a second range interval, wherein the second range interval is further away from the TRP than the first range interval, and wherein a number of PRS resources of the first PRS resource set is smaller than a number of PRS resources of the second PRS resource set.

Clause 38. The location server of any of clause 36 or 37, wherein the second configuration is indicated in PRS assistance data transmitted from the location server to the UE.

Clause 39. The location server of any of clauses 36-38, wherein the one or more processors are further configured to: update the second configuration based on a location change of the UE.

Clause 40. The location server of any of clauses 36-39, wherein the location change of the UE is determined based on: a mobility of the UE; an updated location estimation of the UE; or any combination thereof.

What is claimed is:

1. A method for distance-dependent positioning of a user device (UE) performed by a location server, the method comprising:
   sending, to a transmission/reception point (TRP), a first configuration for distance-dependent position reference signal (PRS) resource sets, the distance-dependent PRS resource sets comprising at least:
      a first PRS resource set for positioning the UE when an estimated distance between the UE and the TRP is within a first range interval;
   determining the estimated distance between the UE and the TRP;
   sending, to the UE, a second configuration for determining PRS measurements based on at least one PRS resource set of the distance-dependent PRS resource sets at the TRP, the at least one PRS resource set corresponding to the estimated distance between the UE and the TRP;
   receiving, from the UE, the PRS measurements; and
   determining the position of the UE based on the PRS measurements.

2. The method of claim 1, further comprising:
   prior to sending the first configuration to the TRP, receiving, from the TRP, capability indication for:
      whether the TRP supports an on-demand PRS transmission;
      one or more distance intervals supported by the PRS resource sets of the TRP;
      whether different PRS resource sets of the TRP can be transmitted simultaneously; or
      any combination thereof,
   wherein sending the first configuration to the TRP is responsive to: 1. the TRP supports the on-demand PRS transmission; and 2. receiving a positioning request from the UE.

3. The method of claim 2, further comprising:
   receiving, from an Operations and Maintenance (O&M) server, the first configuration.

4. The method of claim 1, wherein the distance-dependent PRS resource sets further comprise:
   a second PRS resource set for positioning of the UE when an estimated distance between the UE and the TRP is within a second range interval, wherein the second range interval is further away from the TRP than the first range interval, and
   wherein a number of PRS resources of the first PRS resource set is smaller than a number of PRS resources of the second PRS resource set.

5. The method of claim 1, wherein the second configuration is indicated in PRS assistance data transmitted from the location server to the UE.

6. The method of claim 5, further comprising:
   updating the second configuration based on a location change of the UE.

7. The method of claim 6, wherein the location change of the UE is determined based on:
   a mobility of the UE;
   an updated location estimation of the UE; or
   any combination thereof.

8. The method of claim 6, wherein the location change of the UE is indicated in an LTE Positioning Protocol (LPP) message received from the UE.

9. A method for distance-dependent positioning of a user device (UE) performed by a location server, the method comprising:
   receiving, from an Operations and Maintenance (O&M) server or a base station, a first configuration for distance-dependent position reference signal (PRS) resource sets, the distance-dependent PRS resource sets comprising at least:
      a first PRS resource set for positioning the UE when an estimated distance between the UE and a TRP of the base station is within a first range interval;
   determining the estimated distance between the UE and the TRP;
   sending, to the UE, a second configuration for determining PRS measurements based on at least one PRS resource set of the distance-dependent PRS resource sets at the TRP, the at least one PRS resource set corresponding to the estimated distance between the UE and the TRP;
   receiving, from the UE, the PRS measurements; and
   determining the position of the UE based on the PRS measurements.

10. The method of claim 9, wherein the distance-dependent PRS resource sets further comprise:
    a second PRS resource set for positioning of the UE when an estimated distance between the UE and the TRP is within a second range interval, wherein the second range interval is further away from the TRP than the first range interval, and
    wherein a number of PRS resources of the first PRS resource set is smaller than a number of PRS resources of the second PRS resource set.

11. The method of claim 9, wherein the second configuration is indicated in PRS assistance data transmitted from the location server to the UE.

12. The method of claim 11, further comprising:
    updating the second configuration based on a location change of the UE.

13. The method of claim 12, wherein the location change of the UE is determined based on:
    a mobility of the UE;
    an updated location estimation of the UE; or
    any combination thereof.

14. A location server comprising:
one or more transceivers;
a memory; and
one or more processors communicatively coupled with the one or more transceivers and the memory, wherein the one or more processors are configured to:
send, to a transmission/reception point (TRP), a first configuration for distance-dependent position reference signal (PRS) resource sets, the distance-dependent PRS resource sets comprising at least:
a first PRS resource set for positioning the UE when an estimated distance between the UE and the TRP is within a first range interval;
determine the estimated distance between the UE and the TRP;
send, to the UE, a second configuration for determining PRS measurements based on at least one PRS resource set of the distance-dependent PRS resource sets at the TRP, the at least one PRS resource set corresponding to the estimated distance between the UE and the TRP;
receive, from the UE, the PRS measurements; and
determine the position of the UE based on the PRS measurements.

15. The location server of claim 14, wherein the one or more processors are further configured to:
prior to sending the first configuration to the TRP, receive, from the TRP, capability indication for:
whether the TRP supports an on-demand PRS transmission;
one or more distance intervals supported by the PRS resource sets of the TRP;
whether different PRS resource sets of the TRP can be transmitted simultaneously; or
any combination thereof,
wherein sending the first configuration to the TRP is responsive to: 1. the TRP supports the on-demand PRS transmission; and 2. receiving a positioning request from the UE.

16. The location server of claim 15, wherein the one or more processors are further configured to:
receive, from an Operations and Maintenance (O&M) server, the first configuration.

17. The location server of claim 14, wherein the distance-dependent PRS resource sets further comprise:
a second PRS resource set for positioning of the UE when an estimated distance between the UE and the TRP is within a second range interval, wherein the second range interval is further away from the TRP than the first range interval, and
wherein a number of PRS resources of the first PRS resource set is smaller than a number of PRS resources of the second PRS resource set.

18. The location server of claim 14, wherein the second configuration is indicated in PRS assistance data transmitted from the location server to the UE.

19. The location server of claim 18, wherein the one or more processors are further configured to:
update the second configuration based on a location change of the UE.

20. The location server of claim 19, wherein the location change of the UE is determined based on:
a mobility of the UE;
an updated location estimation of the UE; or
any combination thereof.

21. The location server of claim 19, wherein the location change of the UE is indicated in an LTE Positioning Protocol (LPP) message received from the UE.

22. A location server comprising:
one or more transceivers;
a memory; and
one or more processors communicatively coupled with the one or more transceivers and the memory, wherein the one or more processors are configured to:
receive, from an Operations and Maintenance (O&M) server or a base station, a first configuration for distance-dependent position reference signal (PRS) resource sets, the distance-dependent PRS resource sets comprising at least:
a first PRS resource set for positioning the UE when an estimated distance between the UE and a TRP of the base station is within a first range interval;
determine the estimated distance between the UE and the TRP;
send, to the UE, a second configuration for determining PRS measurements based on at least one PRS resource set of the distance-dependent PRS resource sets at the TRP, the at least one PRS resource set corresponding to the estimated distance between the UE and the TRP;
receive, from the UE, the PRS measurements; and
determine the position of the UE based on the PRS measurements.

23. The TRP of claim 22, wherein the distance-dependent PRS resource sets further comprise:
a second PRS resource set for positioning of the UE when an estimated distance between the UE and the TRP is within a second range interval, wherein the second range interval is further away from the TRP than the first range interval, and
wherein a number of PRS resources of the first PRS resource set is smaller than a number of PRS resources of the second PRS resource set.

24. The TRP of claim 22, wherein the second configuration is indicated in PRS assistance data transmitted from the location server to the UE.

25. The TRP of claim 24, wherein the one or more processors are further configured to:
update the second configuration based on a location change of the UE.

26. The TRP of claim 25, wherein the location change of the UE is determined based on:
a mobility of the UE;
an updated location estimation of the UE; or
any combination thereof.

* * * * *